US012557746B2

(12) United States Patent
Gupta et al.

(10) Patent No.: US 12,557,746 B2
(45) Date of Patent: Feb. 24, 2026

(54) APPARATUS FOR PROTECTING A BUILDING FROM WEATHER ELEMENTS

(71) Applicants: Itisha Gupta, Gurgaon (IN); Sarthak Jindal, Acton, MA (US)

(72) Inventors: Itisha Gupta, Gurgaon (IN); Sarthak Jindal, Acton, MA (US)

( * ) Notice: Subject to any disclaimer, the term of this patent is extended or adjusted under 35 U.S.C. 154(b) by 219 days.

(21) Appl. No.: 18/507,109

(22) Filed: Nov. 13, 2023

(65) Prior Publication Data

US 2025/0151684 A1    May 15, 2025

(51) Int. Cl.
*A01G 31/06* (2006.01)
(52) U.S. Cl.
CPC ..................................... *A01G 31/06* (2013.01)
(58) Field of Classification Search
CPC .......... A01G 31/02; A01G 31/008; E04B 1/34
See application file for complete search history.

(56) References Cited

U.S. PATENT DOCUMENTS

| | | | | |
|---|---|---|---|---|
| 2,378,563 | A * | 6/1945 | Lakatos, Jr. ............ | F41H 11/04 |
| | | | | 89/36.16 |
| 4,753,036 | A * | 6/1988 | Konno .................... | A01G 31/02 |
| | | | | 47/59 R |
| 6,233,870 | B1 * | 5/2001 | Horibata ................ | A01G 31/02 |
| | | | | 47/62 N |
| 10,246,889 | B1 * | 4/2019 | Nogueras ................ | E04G 21/28 |
| 10,472,827 | B1 * | 11/2019 | Mouriz ................... | E04G 21/28 |
| 10,683,666 | B1 * | 6/2020 | Mouriz ................... | E04D 5/146 |
| 10,851,546 | B2 * | 12/2020 | Mouriz ................... | E04D 5/06 |
| 11,344,756 | B1 * | 5/2022 | Kellum ................... | A62C 2/24 |
| 11,808,044 | B1 * | 11/2023 | Hinojosa ................. | E04D 5/04 |
| 2002/0095898 | A1 * | 7/2002 | Bettencourt ............ | E04G 21/28 |
| | | | | 52/506.01 |
| 2005/0138867 | A1 * | 6/2005 | Zhao ....................... | A01G 9/14 |
| | | | | 52/79.1 |

(Continued)

FOREIGN PATENT DOCUMENTS

| | | | | |
|---|---|---|---|---|
| JP | | 07327516 A | * 12/1995 | |
| JP | | 3158257 U | * 3/2010 | ............. A01G 31/02 |
| WO | WO-2014009884 A1 | * 1/2014 | ............. E04D 13/12 |

*Primary Examiner* — Kyle J. Walraed-Sullivan
(74) *Attorney, Agent, or Firm* — Dhiraj Jindal; PATENT YOGI LLC

(57) ABSTRACT

An apparatus for protecting a building from weather elements comprises a structure installable on a roof of the building and elevatable to an elevated position from an unelevated position for protecting the building from weather elements, a pumping assembly, and an elevating assembly. The structure comprises a hydroponic cultivating unit comprising a growing container and a tubing unit attached to the hydroponic cultivating unit. The tubing unit couples with a reservoir containing a growing solution in the unelevated position. The pumping assembly coupled with the tubing unit in the unelevated position transfers the growing solution to the growing container from the reservoir through the tubing unit. The elevating assembly raises and lowers the structure, moving the structure between the unelevated position and the elevated position. The tubing unit allows draining of the growing solution from the growing container in the unelevated position and the structure is raised after the draining.

19 Claims, 19 Drawing Sheets

(56)  References Cited

U.S. PATENT DOCUMENTS

| | | | | |
|---|---|---|---|---|
| 2005/0217202 | A1* | 10/2005 | Crook | E04H 9/14 |
| | | | | 52/782.1 |
| 2007/0017016 | A1* | 1/2007 | Piche | E04H 4/084 |
| | | | | 4/498 |
| 2007/0266644 | A1* | 11/2007 | Weicht | E04D 13/00 |
| | | | | 52/3 |
| 2010/0024292 | A1* | 2/2010 | Kertz | A01G 9/024 |
| | | | | 47/17 |
| 2012/0297675 | A1* | 11/2012 | Hashimoto | A01G 9/033 |
| | | | | 47/64 |
| 2013/0160362 | A1* | 6/2013 | Daas | A01G 9/1423 |
| | | | | 47/62 N |
| 2014/0259919 | A1* | 9/2014 | Halmos | A01G 31/02 |
| | | | | 47/62 C |
| 2015/0306435 | A1* | 10/2015 | Margolin | A62C 3/0257 |
| | | | | 169/48 |
| 2016/0183486 | A1* | 6/2016 | Kabakov | A01G 31/042 |
| | | | | 47/62 R |
| 2016/0192594 | A1* | 7/2016 | Mawendra | A01G 31/042 |
| | | | | 47/1.7 |
| 2017/0339845 | A1* | 11/2017 | Wark | A01G 9/16 |
| 2017/0354103 | A1* | 12/2017 | Watson | A01G 9/025 |
| 2018/0092312 | A1* | 4/2018 | Goodwin | A01G 31/02 |
| 2018/0235156 | A1* | 8/2018 | Blair | A01G 9/241 |
| 2019/0159414 | A1* | 5/2019 | Huang | A01G 13/32 |
| 2019/0343055 | A1* | 11/2019 | Sakakibara | A01G 27/003 |
| 2019/0382211 | A1* | 12/2019 | Buberman | A01G 9/028 |
| 2020/0087984 | A1* | 3/2020 | Wells | E06C 7/188 |
| 2021/0176932 | A1* | 6/2021 | Atwal | A01G 31/02 |
| 2022/0183244 | A1* | 6/2022 | Avitan | A01G 31/00 |
| 2025/0107496 | A1* | 4/2025 | Tyink | A01G 31/06 |
| 2025/0223136 | A1* | 7/2025 | Christen | B66B 11/0005 |

* cited by examiner

1502

1504

1508

1510

1506

1512

1800

1812

- AT LEAST ONE INPUT DATA

1806

1802    1804

1900    1804    1810

1804

1804

1804    1804

1818

APPARATUS    1816    1814

APPARATUS FOR PROTECTING A BUILDING FROM WEATHER ELEMENTS

FIELD OF THE INVENTION

Generally, the present disclosure relates to the field of canopy. More specifically, the present disclosure relates to an apparatus for protecting a building from weather elements.

BACKGROUND OF THE INVENTION

Existing techniques for protecting a building from weather elements are deficient with regard to several aspects. For instance, current apparatuses installed on the building are spheroidally shaped which restricts the protection of the building from the weather elements. As a result, different apparatuses are needed that are not spheroidally shaped and offer substantial protection to the building. Furthermore, current apparatuses are designed to stay in a place. As a result, different apparatuses are needed that steer automatically based on weather conditions. Moreover, current apparatuses are designed to provide shade. As a result, different apparatuses are needed that integrate hydroponic units in a structure to protect the building from the weather elements.

Therefore, there is a need for improved apparatus for protecting a building from weather elements that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for protecting a building from weather elements, in accordance with some embodiments. Accordingly, the apparatus may include a structure, at least one pumping assembly, and at least one elevating assembly. Further, the structure may be configured to be installed on a roof of the building. Further, the structure may be elevatable to at least one elevated position from an unelevated position for positioning the structure in relation to the building. Further, the structure may be disposed on the roof of the building in the unelevated position. Further, the structure may be raised from the roof of the building in the at least one elevated position for protecting the building from at least one weather element. Further, the structure may include at least one hydroponic cultivating unit and at least one tubing unit attached to the at least one hydroponic cultivating unit. Further, each of the at least one hydroponic cultivating unit may include a growing container comprising at least one port. Further, the at least one tubing unit may be fluidly coupled with the at least one port. Further, the at least one tubing unit may be configured to be coupled with at least one reservoir containing a growing solution in the unelevated position. Further, the at least one pumping assembly may be configured to be coupled with the at least one tubing unit in the unelevated position. Further, the at least one pumping assembly may be configured for transferring the growing solution to the growing container from the at least one reservoir through the at least one tubing unit based on the coupling with the at least one tubing unit. Further, the at least one elevating assembly may be coupled with the structure. Further, the at least one elevating assembly may be configured for at least one of raising and lowering the structure for moving the structure between the unelevated position and the at least one elevated position by performing at least one action on the structure. Further, the at least one tubing unit may be configured for allowing draining of the growing solution from the growing container to the at least one reservoir in the unelevated position. Further, the structure may be raised after the draining of the growing solution.

Further disclosed herein is an apparatus for protecting a building from weather elements, in accordance with some embodiments. Accordingly, the apparatus may include a structure, at least one pumping assembly, at least one elevating assembly, a communication device, and a processing device. Further, the structure may be configured to be installed on a roof of the building. Further, the structure may be elevatable to at least one elevated position from an unelevated position for positioning the structure in relation to the building. Further, the structure may be disposed on the roof of the building in the unelevated position. Further, the structure may be raised from the roof of the building in the at least one elevated position for protecting the building from at least one weather element. Further, the structure may include at least one hydroponic cultivating unit and at least one tubing unit attached to the at least one hydroponic cultivating unit. Further, each of the at least one hydroponic cultivating unit may include a growing container comprising at least one port. Further, the at least one tubing unit may be fluidly coupled with the at least one port. Further, the at least one tubing unit may be configured to be coupled with at least one reservoir containing a growing solution in the unelevated position. Further, the at least one pumping assembly may be configured to be coupled with the at least one tubing unit in the unelevated position. Further, the at least one pumping assembly may be configured for transferring the growing solution to the growing container from the at least one reservoir through the at least one tubing unit based on the coupling with the at least one tubing unit. Further, the at least one elevating assembly may be coupled with the structure. Further, the at least one elevating assembly may be configured for at least one of raising and lowering the structure for moving the structure between the unelevated position and the at least one elevated position by performing at least one action on the structure. Further, the at least one tubing unit may be configured for allowing draining of the growing solution from the growing container to the at least one reservoir in the unelevated position. Further, the structure may be raised after the draining of the growing solution. Further, the communication device may be communicatively coupled with the at least one elevating assembly. Further, the communication device may be configured for receiving at least one input data. Further, the communication device may be configured for transmitting at least one command to the at least one elevating assembly. Further, at least one of the raising and the lowering of the structure may be based on the at least one command. Further, the processing device may be communicatively coupled with the communication device. Further, the processing device may be configured for analyzing the at least one input data. Further, the processing device may be configured for determining at least one value of at least one parameter associated with at least one of the raising and the lowering of the structure. Further, the processing device may be configured for generating the at least one command based on the determining of the at least one value of the at least one parameter.

Further disclosed herein is an apparatus for protecting a building from weather elements, in accordance with some embodiments. Accordingly, the apparatus may include a structure, at least one pumping assembly, at least one elevating assembly, and at least one tether assembly. Further, the structure may be configured to be installed on a roof of the building. Further, the structure may be elevatable to at least one elevated position from an unelevated position for positioning the structure in relation to the building. Further, the structure may be disposed on the roof of the building in the unelevated position. Further, the structure may be raised from the roof of the building in the at least one elevated position for protecting the building from at least one weather element. Further, the structure may include at least one hydroponic cultivating unit and at least one tubing unit attached to the at least one hydroponic cultivating unit. Further, each of the at least one hydroponic cultivating unit may include a growing container comprising at least one port. Further, the at least one tubing unit may be fluidly coupled with the at least one port. Further, the at least one tubing unit may be configured to be coupled with at least one reservoir containing a growing solution in the unelevated position. Further, the at least one pumping assembly may be configured to be coupled with the at least one tubing unit in the unelevated position. Further, the at least one pumping assembly may be configured for transferring the growing solution to the growing container from the at least one reservoir through the at least one tubing unit based on the coupling with the at least one tubing unit. Further, the at least one elevating assembly may be coupled with the structure. Further, the at least one elevating assembly may be configured for at least one of raising and lowering the structure for moving the structure between the unelevated position and the at least one elevated position by performing at least one action on the structure. Further, the at least one tubing unit may be configured for allowing draining of the growing solution from the growing container to the at least one reservoir in the unelevated position. Further, the structure may be raised after the draining of the growing solution. Further, the at least one tether assembly may be coupled with the structure. Further, the at least one tether assembly may be configured for movably attaching the structure to the building. Further, the at least one tether assembly holds the structure in at least one of the unelevated position and the at least one elevated position by supporting the structure. Further, the at least one tether assembly may be configured for supportably at least one of the raising and the lowering of the structure.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
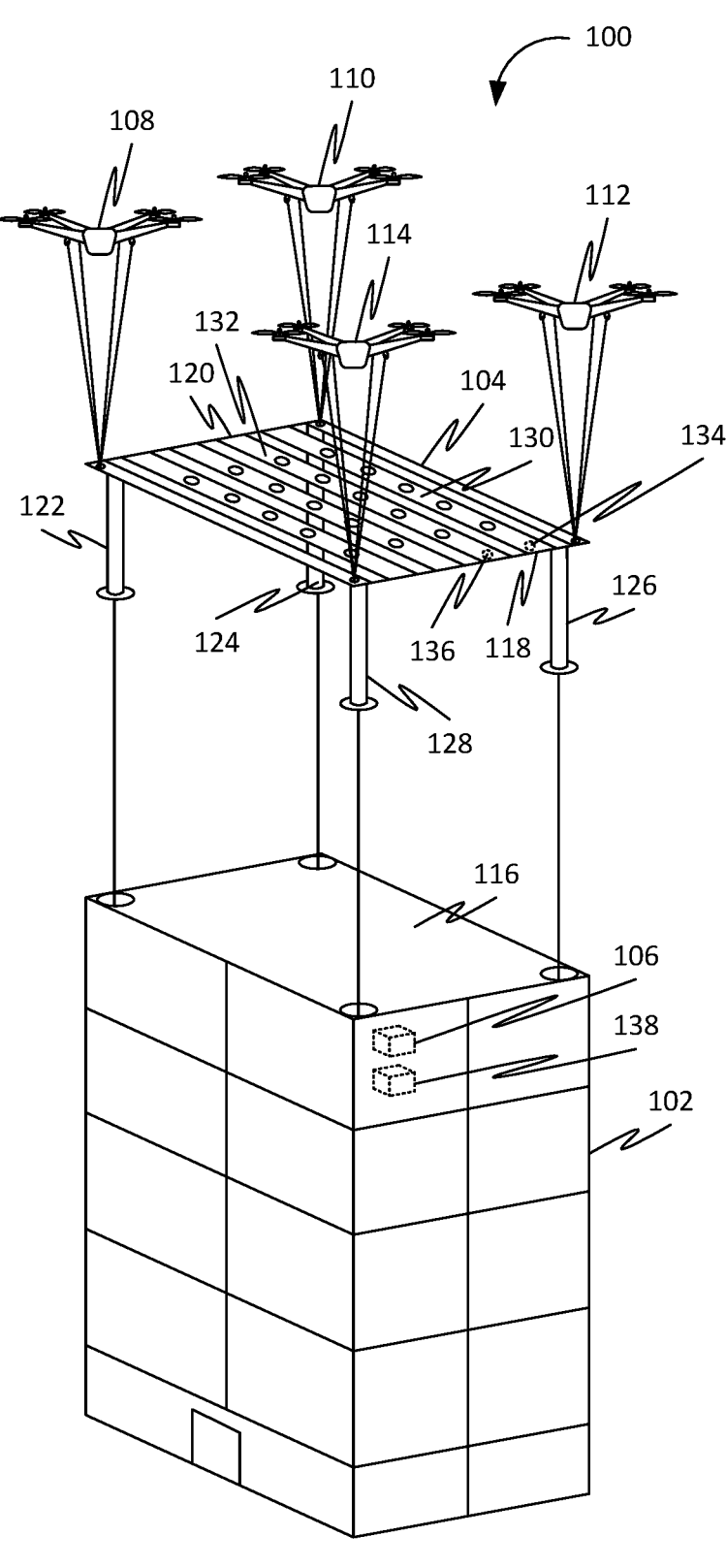
FIG. 1 is a perspective view of an apparatus 100 for protecting a building 102 from weather elements, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an apparatus for protecting a building from weather elements, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Further, one or more steps of the method disclosed herein may be initiated, maintained, controlled, and/or terminated based on a control input received from one or more devices operated by one or more users such as, for example, but not limited to, a user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more pre-defined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Overview

The present disclosure describes an apparatus for protecting a building from weather elements. Further, the apparatus may be a flying canopy. Further, the flying canopy may include a structure. Further, the structure may include helium-filled pipes. Further, the flying canopy may include drones that are attached to the pipes. Further, the structure may be constructed of very lightweight carbon fiber and other super-light materials. Further, the flying canopy may be flat. Further, the electrical motors of the flying canopy may be powered by solar energy. Further, one portion of the structure is covered by white/silver paint. Further, one portion of the structure is covered by solar panels. Further, one portion of the structure is covered by plants. Further, the flying canopy may be steered and held in place via a wireless remote control by someone on the ground. Further, the flying canopy may be automatically steered via sun direction, wind direction, weather prediction, cloud shadows, etc., using machine learning/AI. Further, the drones of the flying canopy may be controlled simultaneously to keep the flying canopy in place. Further, the plants of the flying canopy may receive air, water, nutrients, and sunlight in the flying canopy. Further, the flying canopy may be installed on a building. Further, the building may include a water/nutrient pump system. When the flying canopy lands on the building, the pump will circulate the water/nutrients through all the plants. Further, the flying canopy may include Hydro-sensors. Further, the flying canopy may tethers for the safety of the flying canopy.

FIG. 1 is a perspective view of an apparatus 100 for protecting a building 102 from weather elements, in accordance with some embodiments. Accordingly, the apparatus 100 may include a structure 104, at least one pumping assembly 106, and at least one elevating assembly 108-114. Further, the apparatus 100 may include a flying canopy. Further, the building 102 may be a static structure.

Further, the structure 104 may be configured to be installed on a roof 116 of the building 102. Further, the structure 104 may be flat. Further, the structure 104 forms a canopy. Further, the structure 104 may be circularly shaped, rectangularly shaped, etc. Further, a shape of the structure 104 may correspond to a shape of the roof 116. Further, the structure 104 may be elevatable to at least one elevated position from an unelevated position for positioning the structure 104 in relation to the building 102. Further, the structure 104 may be disposed on the roof 116 of the building 102 in the unelevated position. Further, the structure 104 may be raised from the roof 116 of the building 102 in the at least one elevated position for protecting the building 102 from at least one weather element. Further, the at least one weather element may include sunlight, rain, hail, etc. Further, the protecting of the building 102 may include providing a shade to the building 102. Further, the structure 104 creates a shadow of at least one size on the building 102 based on the elevating of the structure 104 to the at least one elevated position. Further, the structure 104 may include at least one hydroponic cultivating unit 118-120 and at least one tubing unit 122-128 attached to the at least one hydroponic cultivating unit 118-120. Further, the at least one hydroponic cultivating unit 118-120 may be used for growing at least one plant hydroponically. Further, the at least one plant may include at least one hydroponic plant. Further, each of the at least one hydroponic cultivating unit 118-120 may include a growing container (130 and 132) comprising at least one port (134 and 136). Further, the growing container (130 and 132) may include at least one plant receptacle for supporting the growing of the at least one plant hydroponically. Further, the at least one port (134 and 136) may include an inlet and an outlet. Further, the at least one tubing unit 122-128 may be fluidly coupled with the at least one port (134 and 136). Further, the at least one tubing unit 122-128 may be configured to be coupled with at least one reservoir 138 containing a growing solution in the unelevated position. Further, the at least one reservoir 138 may be disposed in the building 102. Further, the at least one tubing unit 122-128 may include pipes, channels, tubes, etc. for fluidly coupling the inlet and outlet to the at least one reservoir 138. Further, the at least one hydroponic cultivating unit 118-120 forms a bed of the structure 104. Further, the at least one tubing unit 122-128 forms at least one leg of the structure 104 peripherally attached to the bed. Further, the at least one leg extends perpendicularly from the bed. Further, the at least one hydroponic cultivating unit 118-120 may be fluidly coupled allowing movement of the growing solution between the at least one hydroponic cultivating unit 118-120. Further, the growing solution may be a solution comprising at least one mineral, at least one nutrient, etc., required for the growing of the at least one plant hydroponically.

Figure 5:
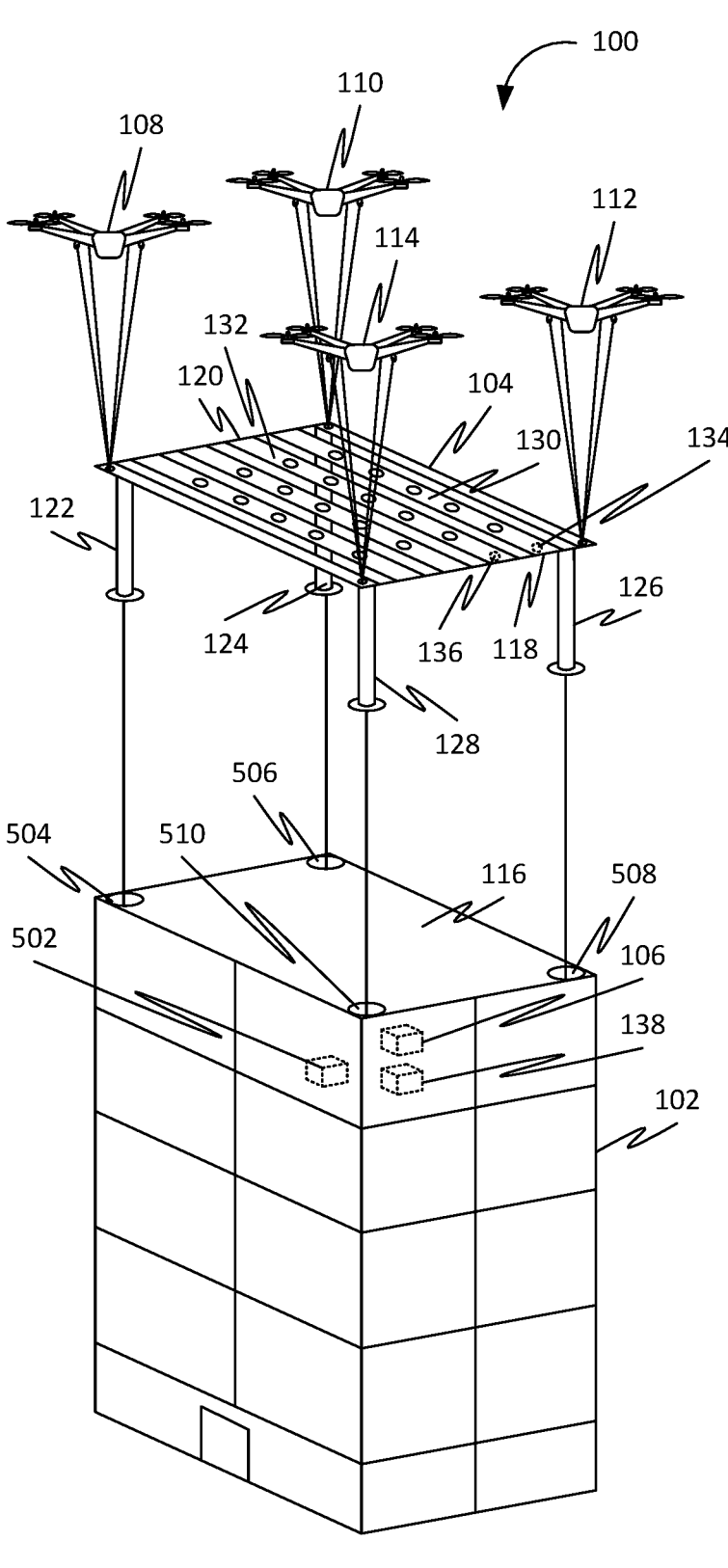
FIG. 5 is a perspective view of the apparatus 100, in accordance with some embodiments.

Further, the at least one pumping assembly 106 may be configured to be coupled with the at least one tubing unit 122-128 in the unelevated position. Further, the at least one pumping assembly 106 may be configured for transferring the growing solution to the growing container (130 and 132) from the at least one reservoir 138 through the at least one tubing unit 122-128 based on the coupling with the at least one tubing unit 122-128. Further, the at least one pumping assembly 106 may be disposed in the building 102. Further, the transferring of the growing solution may include circulating the growing solution between the at least one hydroponic cultivating unit 118-120 and the at least one reservoir 138. Further, the at least one pumping assembly may include an electrically powered pump and a tubing apparatus. Further, the electrically powered pump may be electrically actuatable. Further, in an embodiment, the building 102 may include at least one receptacle 504-510, as shown in FIG. 5, comprised in the building 102. Further, the at least one leg comprising the at least one tubing unit 122-128 moves into the at least one receptacle 504-510 based on transitioning from the at least one elevated position to the unelevated position. Further, the moving of the at least one leg comprising the at least one tubing unit 122-128 to the unelevated position fluidly couples the at least one tubing unit 122-128 with the at least one reservoir 138 and the at least one pumping assembly 106.

Further, the at least one elevating assembly 108-114 may be coupled with the structure 104. Further, the at least one elevating assembly 108-114 may be configured for at least one of raising and lowering the structure 104 for moving the structure 104 between the unelevated position and the at least one elevated position by performing at least one action on the structure 104. Further, the at least one tubing unit 122-128 may be configured for allowing draining of the growing solution from the growing container (130 and 132) to the at least one reservoir 138 in the unelevated position. Further, the structure 104 may be raised after the draining of the growing solution. Further, the at least one elevating assembly 108-114 may include unmanned aerial vehicles, air balloons, aerial drones, etc. Further, the at least one action may include a pulling action for moving the structure 104 in an upward direction from the roof 116, a pushing action for moving the structure 104 in a downward direction towards the roof 116, a steering action for steering the structure 104 in a plurality of directions, an orienting action for orienting the structure 101 in a plurality of orientations in relation to the roof 116, etc.

Figure 2:
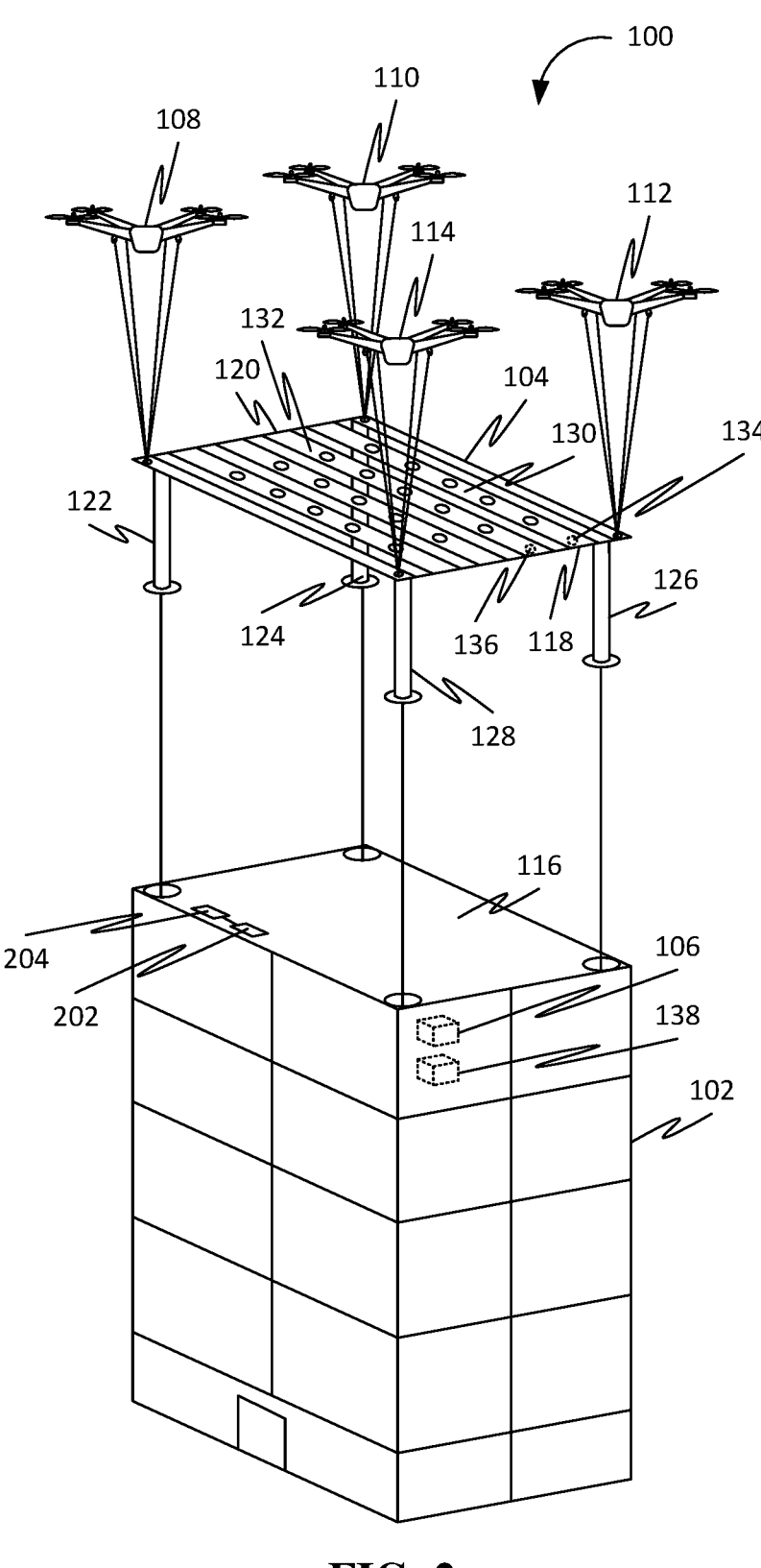
FIG. 2 is a perspective view of the apparatus 100, in accordance with some embodiments.

In further embodiments, the apparatus 100 may include a communication device 202 and a processing device 204, as shown in FIG. 2. Further, the communication device 202 may include a communication interface, etc. Further, the processing device 204 may include a processor, a processing unit, etc. Further, the communication device 202 may be communicatively coupled with the at least one elevating assembly 108-114. Further, the communication device 202 may be configured for receiving at least one input data. Further, the at least one input data may include at least one position requirement for positioning the structure 104 in relation to the building 102. Further, the communication device 202 may be configured for transmitting at least one command to the at least one elevating assembly 108-114. Further, at least one of the raising and the lowering of the structure 104 may be based on the at least one command. Further, the processing device 204 may be communicatively coupled with the communication device 202. Further, the processing device 204 may be configured for analyzing the at least one input data. Further, the processing device 204 may be configured for determining at least one value of at least one parameter associated with at least one of the raising and the lowering of the structure 104. Further, the at least one parameter may include a throttle, a yaw, a pitch, a roll, a collective, etc. Further, the processing device 204 may be configured for generating the at least one command based on the determining of the at least one value of the at least one parameter.

Figure 3:
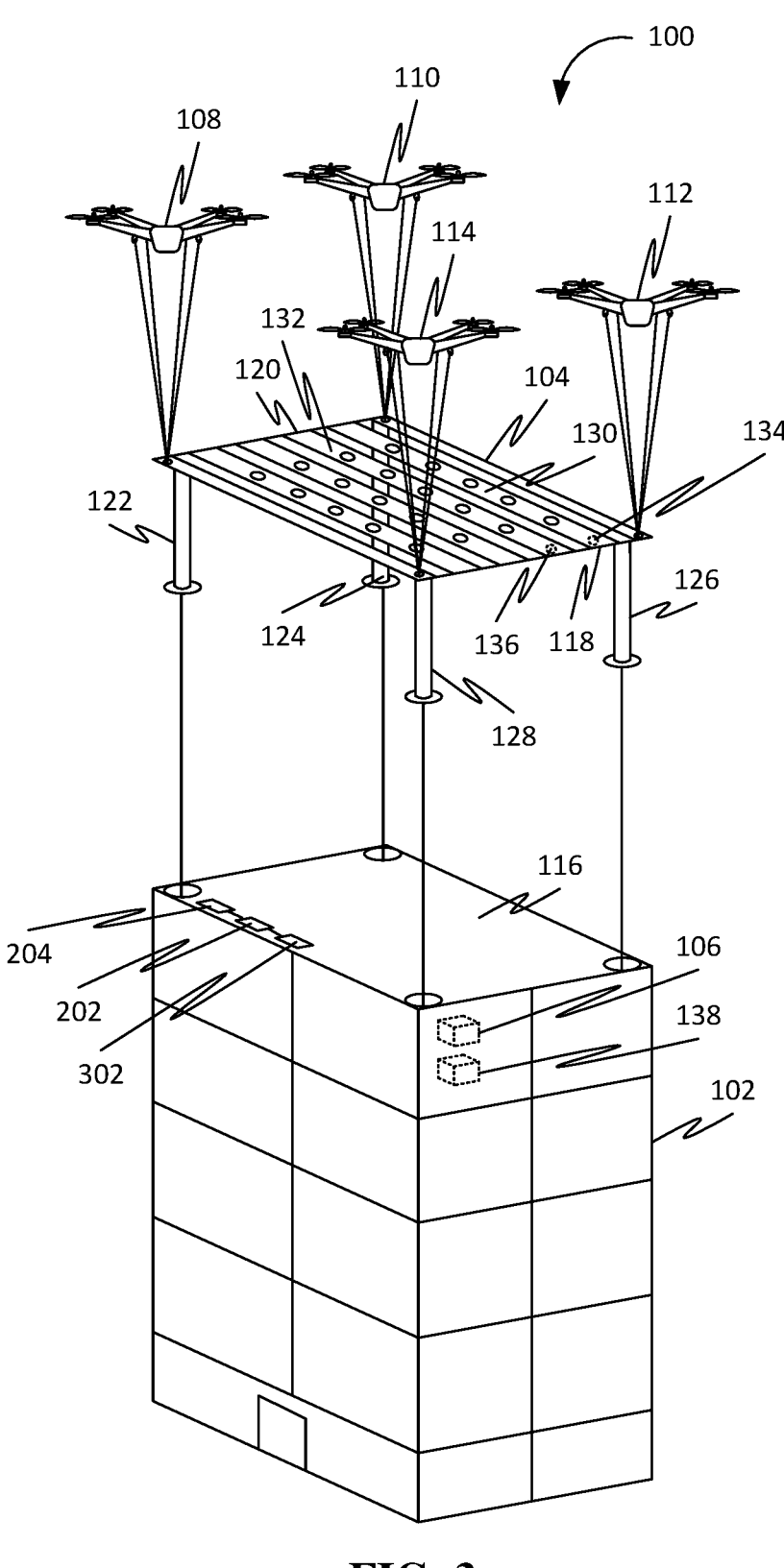
FIG. 3 is a perspective view of the apparatus 100, in accordance with some embodiments.

In an embodiment, the apparatus 100 may include at least one sensor 302, as shown in FIG. 3, communicatively coupled with the communication device 202. Further, the at least one sensor 302 may be configured for generating the at least one input data based on detecting at least one variable associated with at least one of the raising and the lowering of the structure 104 to the at least one elevated position. Further, the at least one sensor 302 may include a motion sensor, an environmental sensor (temperature sensor, humidity sensor, rainfall sensor, light sensor, wind speed sensor, wind direction, etc.), etc. Further, the at least one variable may include temperature, solar intensity, humidity, rainfall, wind speed, wind direction, cloud cover, etc.

Further, in an embodiment, the at least one sensor 302 may include a sun sensor. Further, the sun sensor may be configured for generating at least one sun data based on detecting at least one of a position and a location of the sun in the sky in relation to at least one of the building 102, the roof 116 of the building 102, and the structure 104. Further, the at least one input data may include the at least one sun data. Further, the at least one sun data may include at least one value corresponding to at least one of the position and the location of the sun in the sky in relation to at least one of the building 102, the roof 116 of the building 102, and the structure 104.

Further, in an embodiment, the analyzing of the at least one input data may include analyzing the at least one sun data. Further, the at least one elevating assembly 108-114 may be configured for orienting the structure 104 in at least one orientation and positioning the structure 104 in at least one position by performing the at least one action on the structure 104. Further, the determining of the at least one value of the at least one parameter may include determining the at least one value of the at least one parameter associated with the orienting of the structure 104, the positioning of the structure 104, and at least one of the raising and the lowering of the structure 104 based on the analyzing of the at least one sun data. Further, the generating of the at least one command may be further based on the determining of the at least one value of the at least one parameter associated with the orienting of the structure 104, the positioning of the structure 104, and at least one of the raising and the lowering of the structure 104. Further, the at least one parameter associated with the orienting of the structure 104, the positioning of the structure 104, and at least one of the raising and the lowering of the structure 104 may include the throttle (thrust), the yaw, the pitch, the roll, the collective, etc. Further, the orienting of the structure 104 in the at least one orientation in the at least one elevated position and the positioning of the structure 104 in the at least one position in the at least one elevated position may be based on the at least one command.

Further, in an embodiment, the at least one sensor 302 may include at least one inertial sensor. Further, the at least one inertial sensor may include an accelerometer, a gyroscope, and a magnetometer. Further, the at least one inertial sensor may be configured for generating at least one inertial data associated with the structure 104 by detecting at least one parameter associated with at least one of a motion, an orientation, and a position of the structure 104. Further, the at least one inertial data may include at least one value of the at least one parameter associated with at least one of the motion, the orientation, and the position of the structure 104. Further, at least one of the motion, the orientation, and the position of the structure 104 may be in relation to at least one of the position and the location of the sun in the sky and at least one of the building 102, the roof 116 of the building 102, and the structure 104. Further, the at least one input data may include the at least one inertial data.

Further, in an embodiment, the analyzing of the at least one input data may include analyzing the at least one inertial data. Further, the determining of the at least one value of the at least one parameter associated with the orienting of the structure 104, the positioning of the structure 104, and at least one of the raising and the lowering of the structure 104 may be further based on the analyzing of the at least one inertial data.

Figure 4:
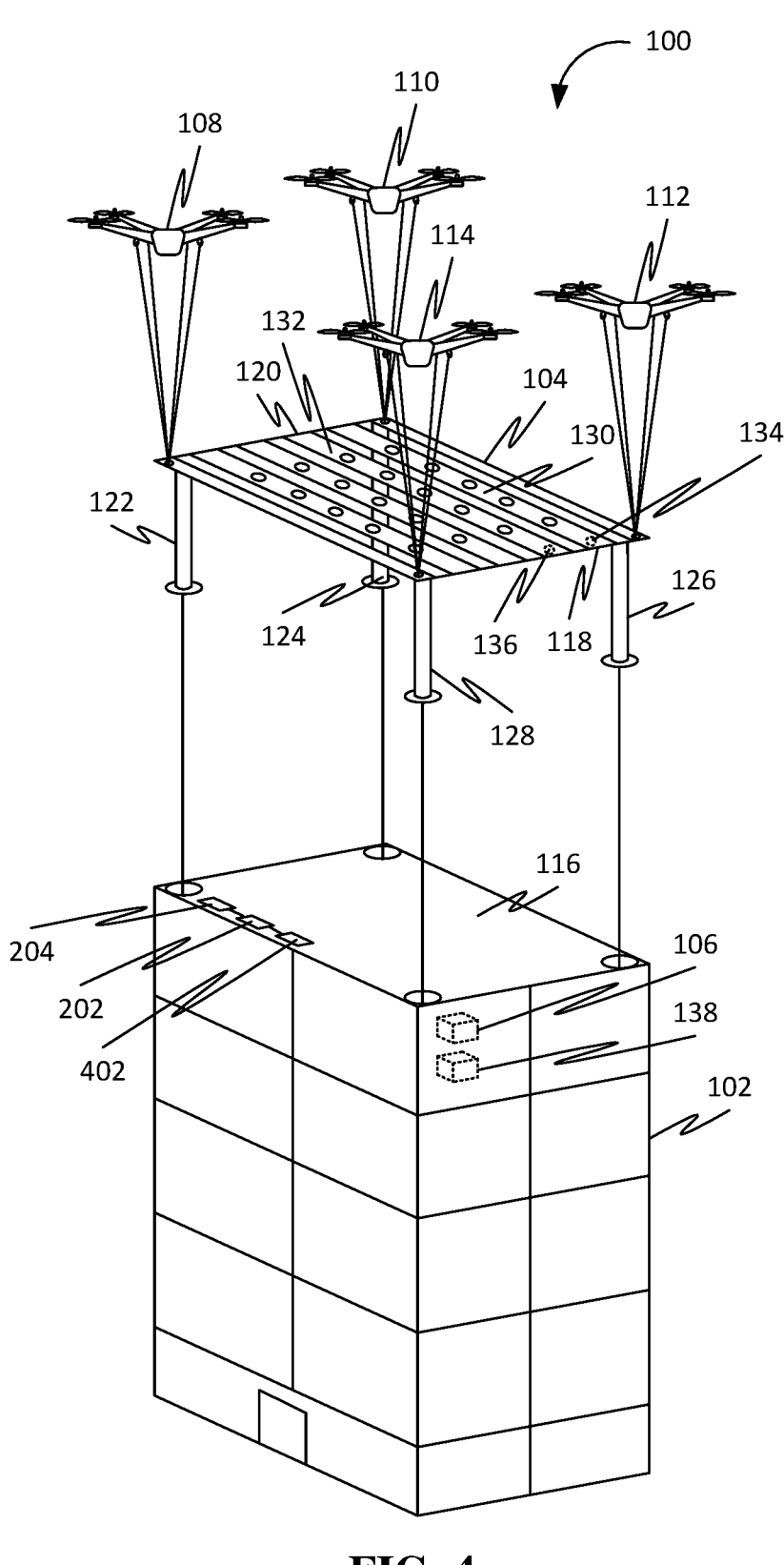
FIG. 4 is a perspective view of the apparatus 100, in accordance with some embodiments.

In an embodiment, the apparatus 100 may include at least one input device 402, as shown in FIG. 4, communicatively coupled with the communication device 202. Further, the at least one input device 402 may be configured for generating the at least one input data based on at least one input received by the at least one input device 402. Further, the at least one input device 402 may include a controller, etc. Further, the at least one input may be received by at least one user.

Further, in an embodiment, the analyzing of the at least one input data may include analyzing the at least one input data using at least one machine learning model. Further, the at least one machine learning model may be trained on a dataset associated with a plurality of conditions associated with at least one of the raising and the lowering of the structure 104. Further, the processing device 204 may be further configured for predicting at least one condition associated with at least one of the raising and the lowering of the structure 104 based on the analyzing of the at least one input data using the at least one machine learning model. Further, the at least one condition corresponds to at least one value of the at least one variable. Further, the determining of the at least one value of the at least one parameter may be further based on the predicting.

Further, in an embodiment, the at least one elevated position may be associated with a plurality of elevated hovering positions. Further, the at least one elevating assembly 108-114 may be configured for transitioning the structure 104 between the plurality of elevated hovering positions associated with the at least one elevated position based on the at least one command. Further, the plurality of elevated hovering positions corresponds to an orientation of the structure 104 in relation to the roof 116 and a relative position of the structure 104 in relation to the roof 116. Further, the plurality of elevated hovering positions may include the at least one position.

In some embodiments, the apparatus 100 may include at least one tether assembly 502, as shown in FIG. 5, coupled with the structure 104. Further, the at least one tether assembly 502 may be configured for movably attaching the structure 104 to the building 102. Further, the at least one tether assembly 502 holds the structure 104 in at least one of the unelevated position and the at least one elevated position by supporting the structure 104. Further, the at least one tether assembly 502 may include a tether, a spindle, a motor, etc. Further, the at least one tether assembly 502 may be disposed in the building 102.

Further, in an embodiment, the at least one tether assembly 502 may be configured for supportably at least one of the raising and the lowering of the structure 104.

In an embodiment, the apparatus 100 may include the communication device 202 and the processing device 204.

Further, the communication device 202 may be communicatively coupled with the at least one tether assembly 502. Further, the communication device 202 may be configured for receiving at least one input data. Further, the communication device 202 may be configured for transmitting at least one command to the at least one tether assembly 502. Further, the supportably at least one of the raising and the lowering of the structure 104 may be based on the at least one command. Further, the processing device 204 may be communicatively coupled with the communication device 202. Further, the processing device 204 may be configured for analyzing the at least one input data. Further, the processing device 204 may be configured for determining at least one value of at least one parameter associated with at least one of the raising and the lowering of the structure 104. Further, the processing device 204 may be configured for generating the at least one command based on the determining of the at least one value of the at least one parameter.

In an embodiment, the apparatus 100 may include the at least one sensor 302 communicatively coupled with the communication device 202. Further, the at least one sensor 302 may be configured for generating the at least one input data based on detecting at least one variable associated with at least one of the raising and the lowering of the structure 104.

In an embodiment, the apparatus 100 may include the at least one input device 402 communicatively coupled with the communication device 202. Further, the at least one input device 402 may be configured for generating the at least one input data based on at least one input received by the at least one input device 402.

Further, in an embodiment, the analyzing of the at least one input data may include analyzing the at least one input data using at least one machine learning model. Further, the at least one machine learning model may be trained on a dataset associated with a plurality of conditions associated with at least one of the raising and the lowering of the structure 104. Further, the processing device 204 may be further configured for predicting at least one condition associated with at least one of the raising and the lowering of the structure 104 based on the analyzing of the at least one input data using the at least one machine learning model. Further, the determining of the at least one value of the at least one parameter may be further based on the predicting.

Figure 6:
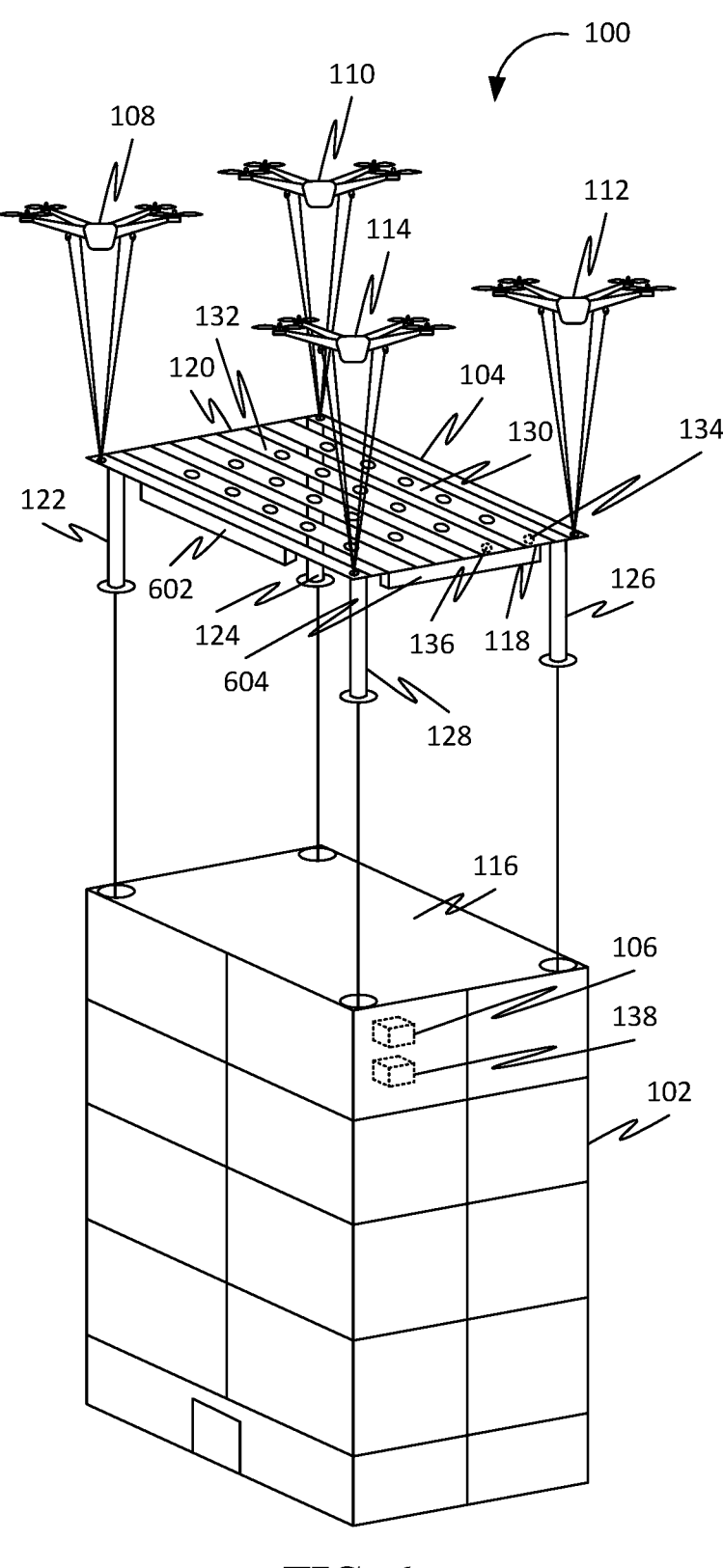
FIG. 6 is a perspective view of the apparatus 100, in accordance with some embodiments.

Further, in some embodiments, the structure 104 may include at least one buoyant element 602-604, as shown in FIG. 6, comprised in the structure 104. Further, the at least one buoyant element 602-604 may include at least one closed ended pipe containing helium. Further, the at least one buoyant element 602-604 facilitates the raising of the structure 104 from the unelevated position to the at least one elevated position.

Figure 7:
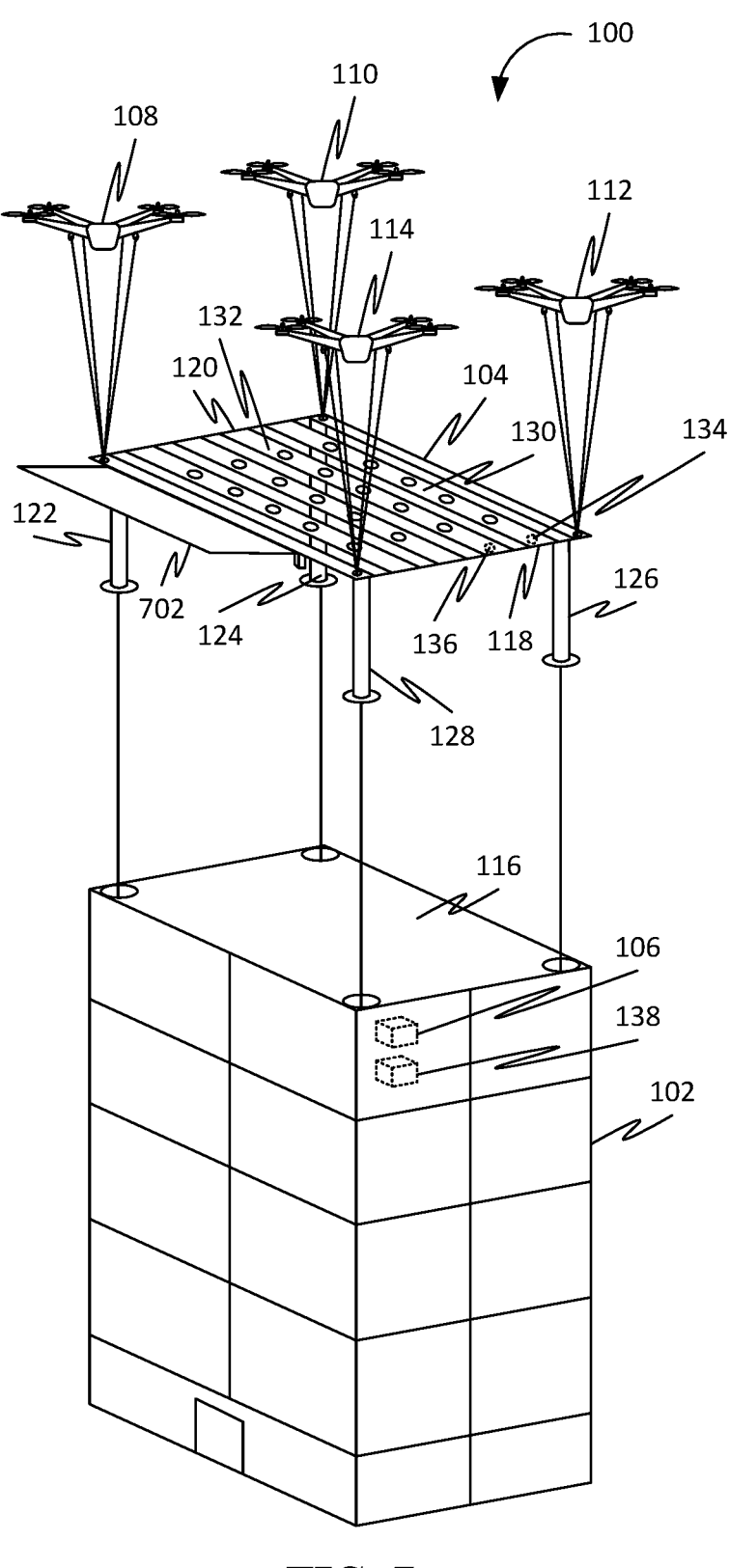
FIG. 7 is a perspective view of the apparatus 100, in accordance with some embodiments.

Further, in some embodiments, the structure 104 may include at least one extendable element 702, as shown in FIG. 7. Further, the at least one extendable element 702 may be configured to be transitioned between a retracted position and at least one extended position. Further, the structure 104 may be associated with a level of protection for the protecting of the building 102 in the at least one elevated position. Further, the at least one extendable element 702 increases the level of protection of the structure 104 by at least one amount in the at least one extended position. Further, the at least one extendable element 702 may include a foldable element and an extending device. Further, in an embodiment, the foldable element may be coated with at least one material. Further, the at least one material may include white paint, silver paint, etc. Further, the foldable element may include a sheet, a flap, etc. Further, the extending device may be an electrically powered motor that extendably retracts the foldable element between the at least one extended position and the retracted position. Further, the level of protection corresponds to a surface area of the structure 104. Further, the increasing of the level of protection of the structure 104 by the at least one amount corresponds to increasing the surface area of the structure 104 by the at least one amount. Further, the surface area corresponds to the shadow of the structure 104. Further, the at least one extendable element 702 may be coupled to at least one side of the structure 104. Further, the at least one side corresponds to at least one edge of the structure 104.

Figure 8:
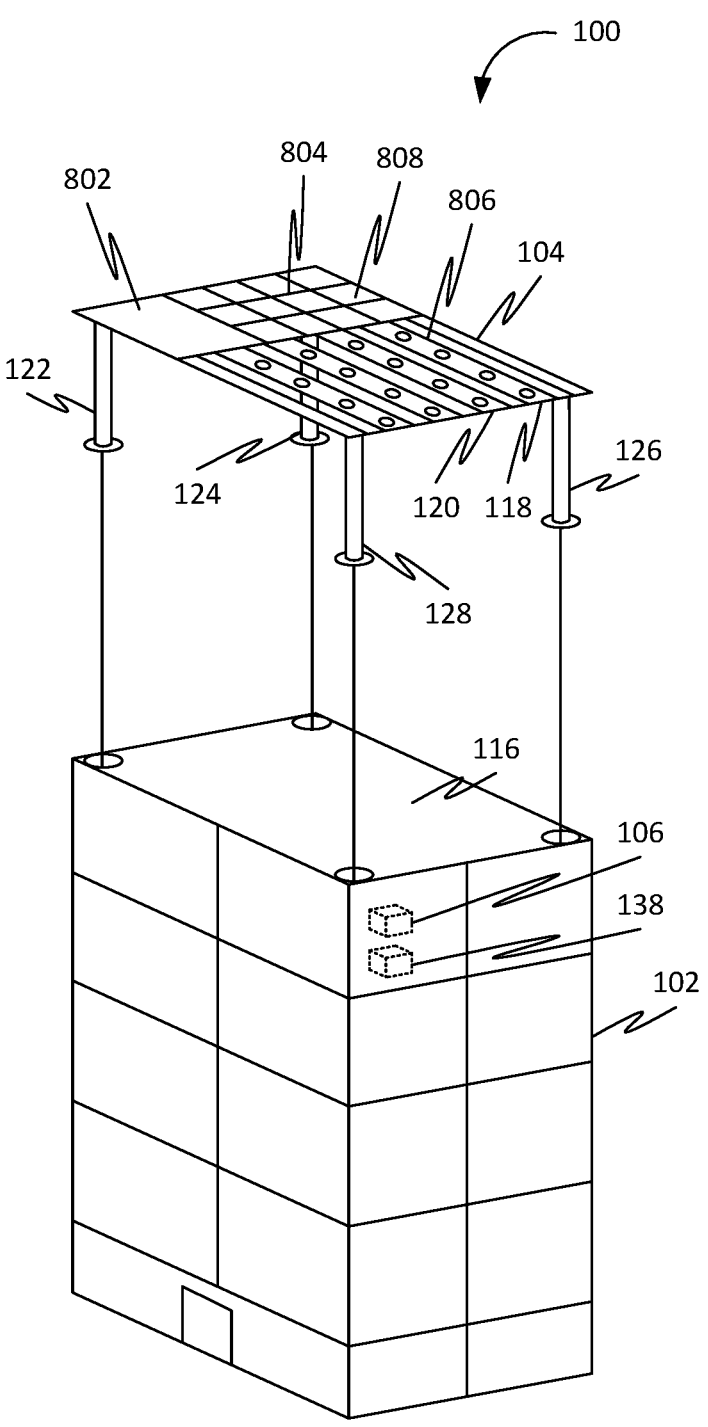
FIG. 8 is a perspective view of the apparatus 100 without the at least one elevating assembly 108-112, in accordance with some embodiments.

Further, in some embodiments, at least a portion 802, as shown in FIG. 8, of the structure 104 may be coated with at least one material. Further, the at least one material may be a heat reflector. Further, the protecting of the building 102 from the at least one weather element may be based on the at least one material. Further, the at least one material may include white paint, silver paint, etc.

Further, in some embodiments, the structure 104 may include at least one solar energy device 808, as shown in FIG. 8. Further, the at least one solar energy device 808 may be attached to at least a portion 804, as shown in FIG. 8, of the structure 104. Further, the at least one solar energy device 808 may be comprised of at least one absorber material. Further, the protecting of the building 102 from the at least one weather element may be based on the at least one absorber material. Further, the at least one solar energy device 808 may include a solar panel, a solar absorber, etc. Further, the at least one absorber material may include photovoltaic absorber materials (such as antimony selenide ($Sb_2Se_3$)).

Further, in some embodiments, the at least one hydroponic cultivating unit 118-120 may be attached to at least a portion 806, as shown in FIG. 8, of the structure 104. Further, the at least one hydroponic cultivating unit 118-120 may include at least one plant grown in the at least one hydroponic cultivating unit 118-120. Further, the protecting of the building 102 from the at least one weather element may be based on the at least one plant. Further, the at least one plant absorbs sunlight.

FIG. 2 is a perspective view of the apparatus 100, in accordance with some embodiments.

FIG. 3 is a perspective view of the apparatus 100, in accordance with some embodiments.

FIG. 4 is a perspective view of the apparatus 100, in accordance with some embodiments.

FIG. 5 is a perspective view of the apparatus 100, in accordance with some embodiments.

FIG. 6 is a perspective view of the apparatus 100, in accordance with some embodiments.

FIG. 7 is a perspective view of the apparatus 100, in accordance with some embodiments.

FIG. 8 is a perspective view of the apparatus 100 without the at least one elevating assembly 108-112, in accordance with some embodiments.

Figure 9:
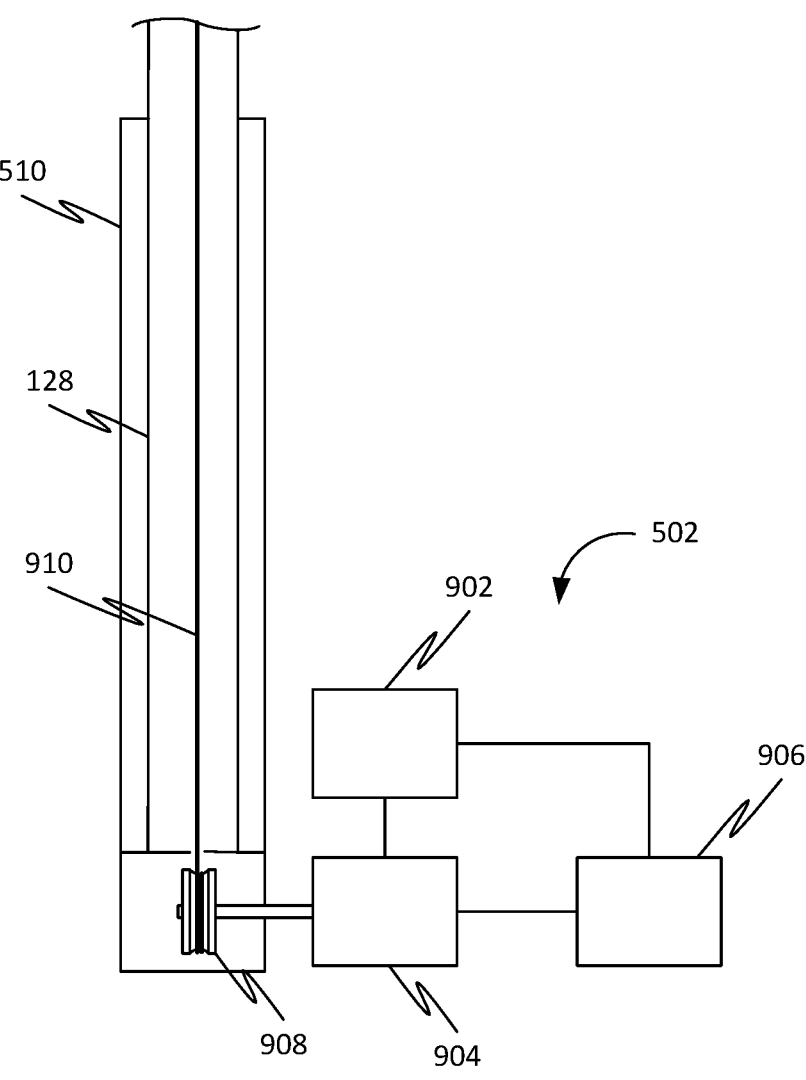
FIG. 9 is a cross-sectional view of a tubing unit 128 of the at least one tubing unit 122-128 of the structure 104 with the at least one tether assembly 502, in accordance with some embodiments.

FIG. 9 is a cross-sectional view of a tubing unit 128 of the at least one tubing unit 122-128 of the structure 104 with the at least one tether assembly 502, in accordance with some embodiments. Further, the at least one tether assembly 502 may include a controller 902, a motor 904 (electrically powered motor), a power source 906, a spindle 908, and a tether 910 (such as a rope, a cable, a wire, etc.). Further, the at least one tubing unit 122-128 moves into the at least one receptacle 504-510 comprised in the building 102 by moving from the at least one elevated position to the unelevated position. Further, a shaft of the motor 904 may be coupled with the spindle 908. Further, a first end of the tether 910 may be attached to the structure 104. Further, the tether 910 extends through the at least one tubing unit 122-128. Further, a second end of the tether 910 may be coupled with the spindle 908. Further, the motor 904 may be configured for rotating the spindle 908 with at least one speed and for at least one duration in at least one direction for at least one of wrapping and unwrapping at least a portion of the tether 910 around the spindle 908. Further, the supportably at least one of the raising and lowering of the structure 104 may be based on at least one of the wrapping and the unwrapping of at least the portion of the tether 910 around the spindle 908. Further, the controller 902 may be operably coupled with the motor 904. Further, the controller 902 may be configured for providing at least one control signal to the motor 904. Further, the rotating of the spindle 908 may be based on the at least one control signal. Further, the power source 906 may be electrically coupled with the controller 902 and the motor 904. Further, the power source 906 may be configured for providing electrical power to the controller 902 and the motor 904. Further, the spindle 908 does not rotate until rotated by the motor 904. Further, the spindle 908 holds the structure 104 in at least one of the at least one elevated position and the unelevated position by not rotating. Further, the controller 902 may be a processor communicatively coupled with the communication device 202. Further, the providing of the at least one signal may be based on the at least one command.

Figure 10:
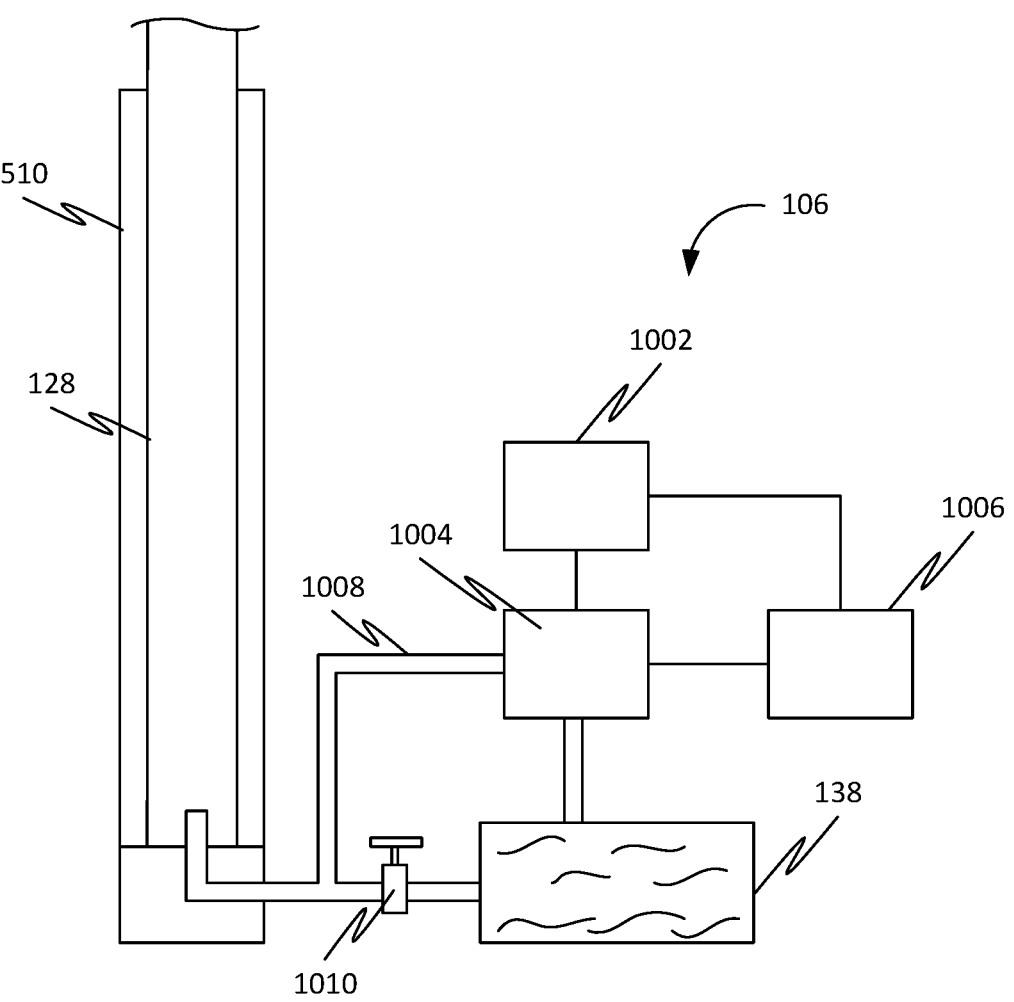
FIG. 10 is a cross-sectional view of the tubing unit 128 of the at least one tubing unit 122-128 of the structure 104 with the at least one pumping assembly 106, in accordance with some embodiments.

FIG. 10 is a cross-sectional view of the tubing unit 128 of the at least one tubing unit 122-128 of the structure 104 with the at least one pumping assembly 106, in accordance with some embodiments. Further, the at least one pumping assembly 106 may include a controller 1002, a pump 1004, and a power source 1006. Further, the at least one tubing unit 122-128 moves into the at least one receptacle 504-510 comprised in the building 102 by moving from the at least one elevated position to the unelevated position. Further, the pump 1004 may be fluidly coupled with the at least one reservoir 138 and the at least one tubing unit 122-128 using at least one piping apparatus 1008. Further, the pump 1004 may be configured for pumping at least one amount of the growing solution from the at least one reservoir 138 to the growing container (130 and 132) of the structure 104. Further, the at least one tubing unit 122-128 may be fluidly coupled with the at least one reservoir 138 using the at least one piping apparatus 1008. Further, the at least one piping apparatus 1008 may include a valve 1010 (such as an electrically actuatable valve). Further, the valve 1010 may be configured to be transitioned between a closed state and an opened state. Further, the valve 1010 allows the draining of the growing solution from the growing container (130 and 132) through the at least one tubing unit 122-128 and the at least one piping apparatus 1008 in the opened state. Further, the controller 1002 may be configured for providing at least one control signal to the pump 1004. Further, the controller 1002 may be configured for providing at least one valve signal to the valve 1010. Further, the transitioning of the valve 1010 may be based on the at least one valve signal. Further, the pumping of the at least one amount of the growing solution may be based on the at least one control signal. Further, the power source 1006 may be electrically coupled with the controller 1002 and the pump 1004. Further, the power source 1006 may be configured for providing electrical power to the controller 1002 and the pump 1004. Further, the controller 1002 may be a processor communicatively coupled with the communication device

202. Further, the providing of the at least one signal and the at least one valve signal may be based on the at least one command.

Figure 11:
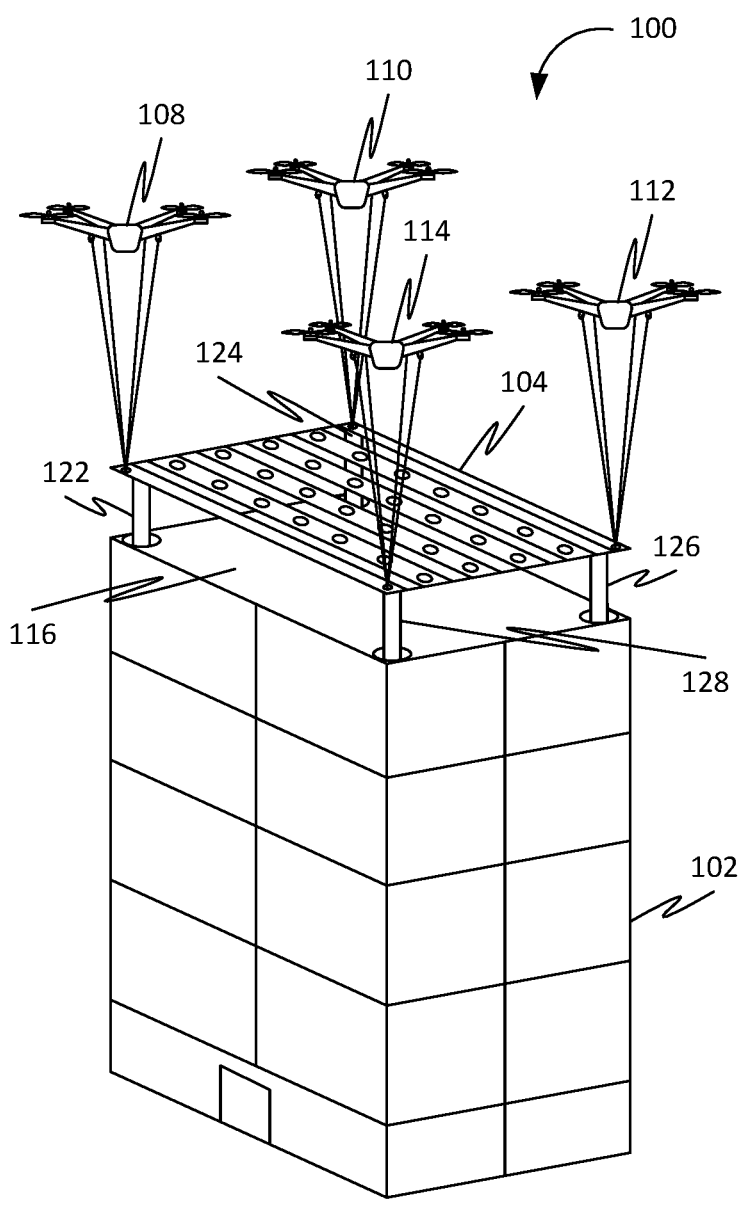
FIG. 11 is a perspective view of the apparatus 100 in an elevated position of the at least one elevated position, in accordance with some embodiments.

FIG. 11 is a perspective view of the apparatus 100 in an elevated position of the at least one elevated position, in accordance with some embodiments.

Figure 12:
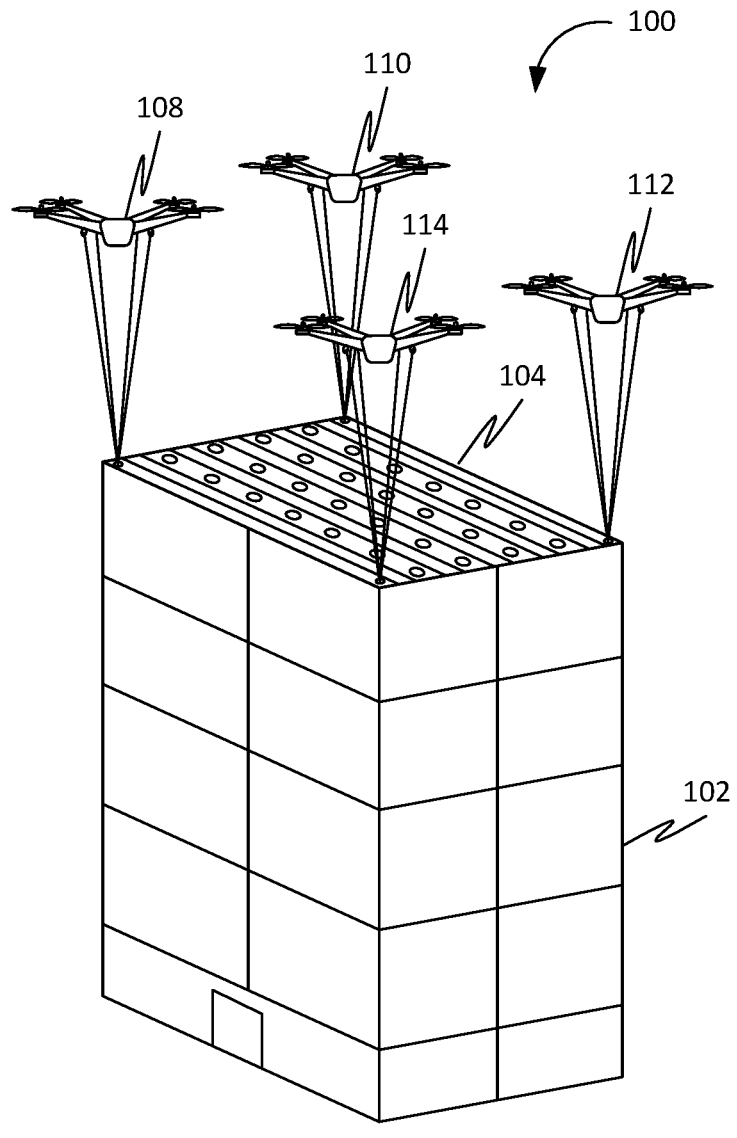
FIG. 12 is a perspective view of the apparatus 100 in the unelevated position, in accordance with some embodiments.

FIG. 12 is a perspective view of the apparatus 100 in the unelevated position, in accordance with some embodiments.

Figure 13:
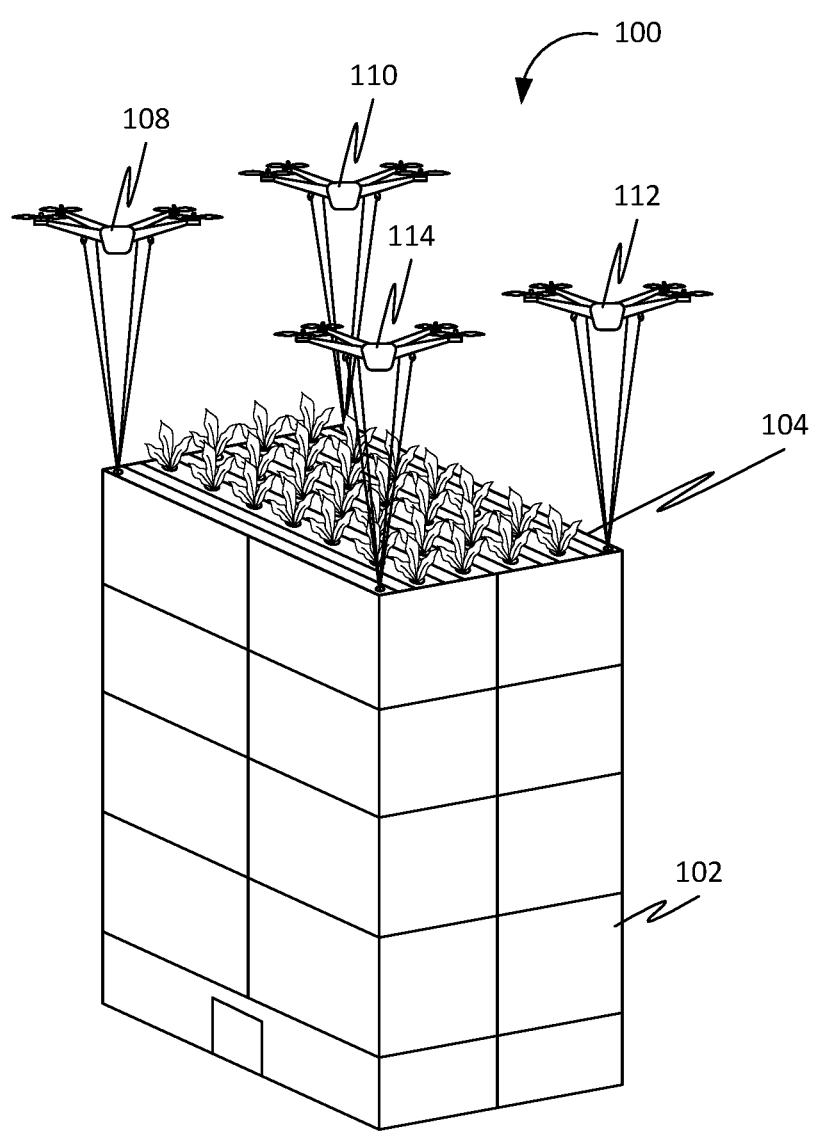
FIG. 13 is a perspective view of the apparatus 100 with the at least one plant in the at least one hydroponic cultivating unit 118-120 of the structure 104, in accordance with some embodiments.

FIG. 13 is a perspective view of the apparatus 100 with the at least one plant in the at least one hydroponic cultivating unit 118-120 of the structure 104, in accordance with some embodiments.

Figure 14:
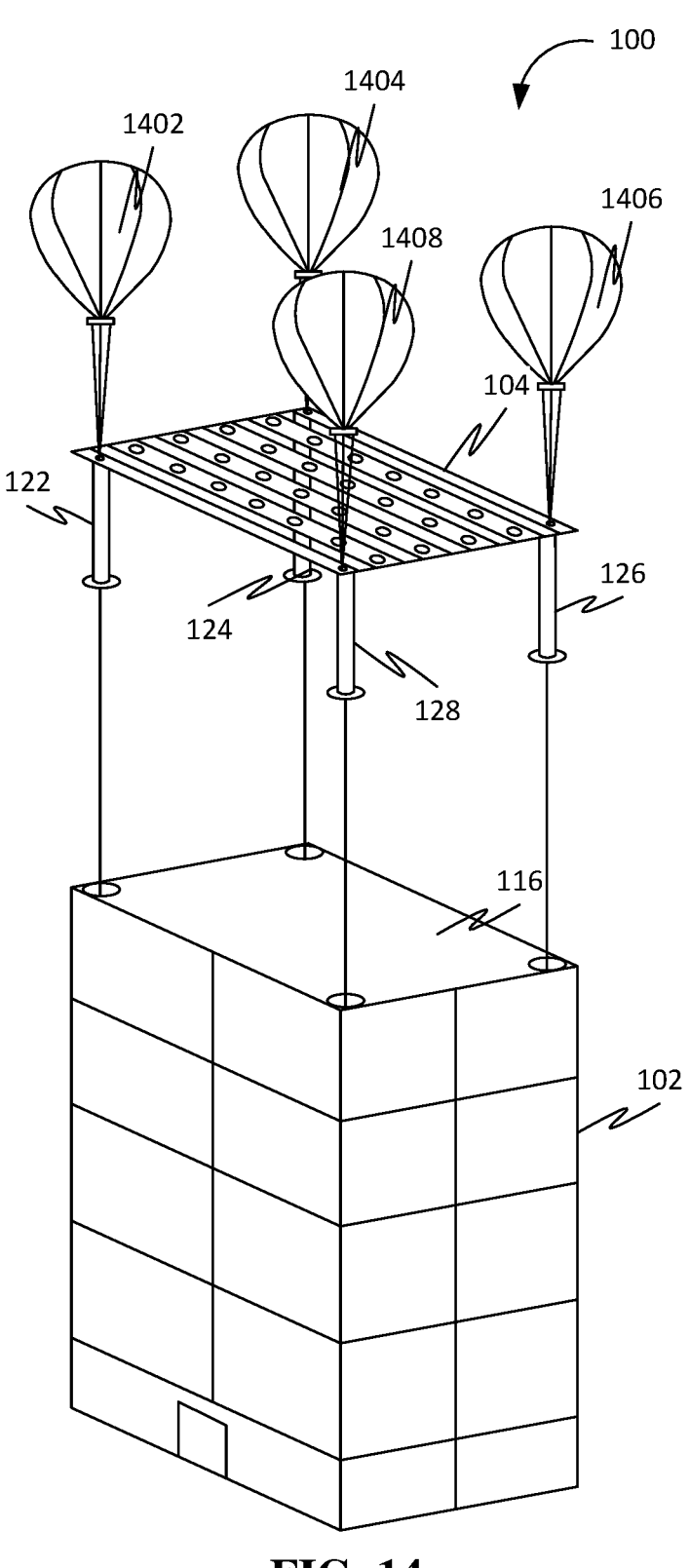
FIG. 14 is a perspective view of the apparatus 100 with at least one elevating device 1402-1408, in accordance with some embodiments.

FIG. 14 is a perspective view of the apparatus 100 with at least one elevating device 1402-1408, in accordance with some embodiments. Further, the at least one elevating device 1402-1408 may be gas filled balloons.

Figure 15:
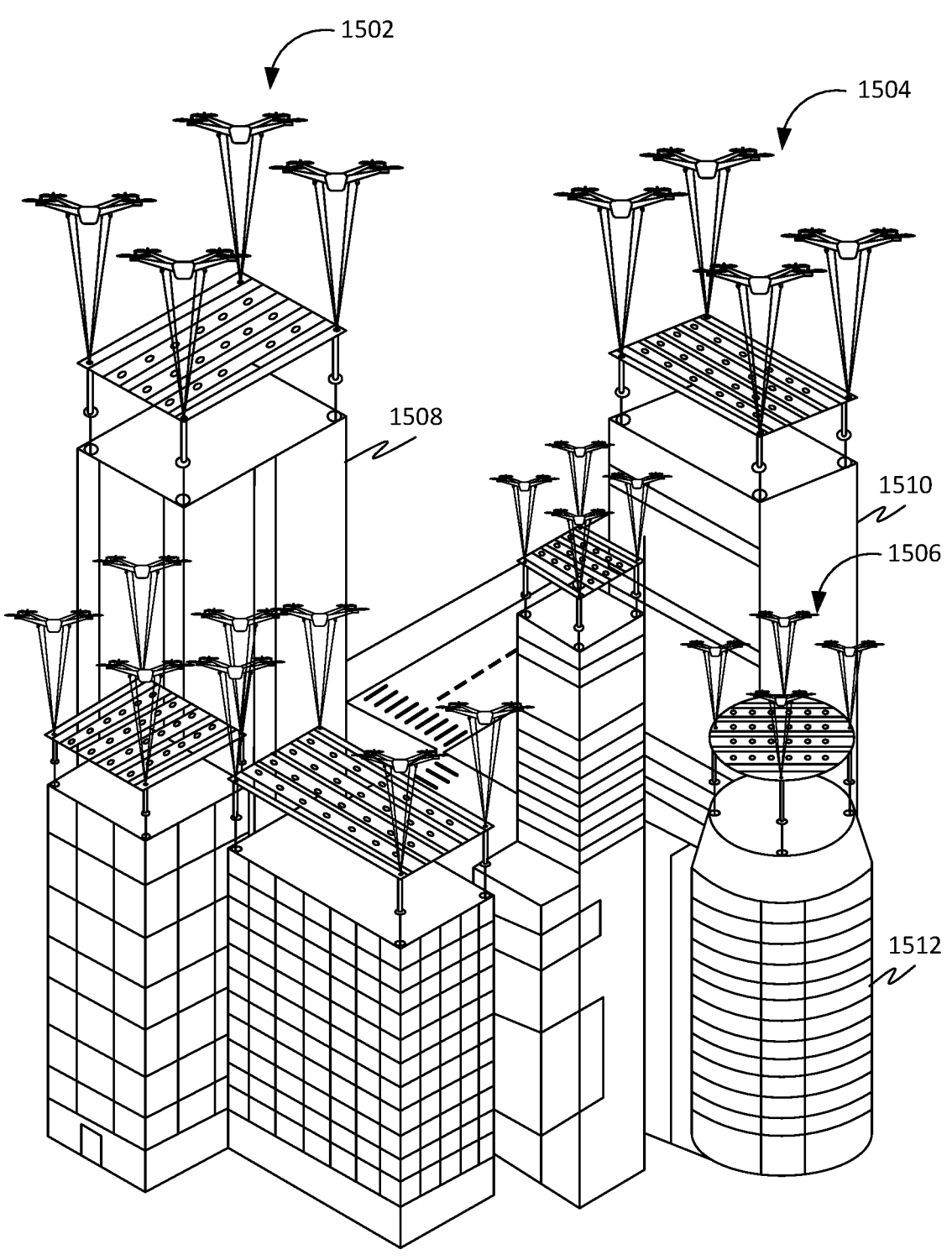
FIG. 15 is a perspective view of a plurality of apparatuses 1502-1506 installed on a plurality of buildings 1508-1512, in accordance with some embodiments.

FIG. 15 is a perspective view of a plurality of apparatuses 1502-1506 installed on a plurality of buildings 1508-1512, in accordance with some embodiments.

Figure 16:
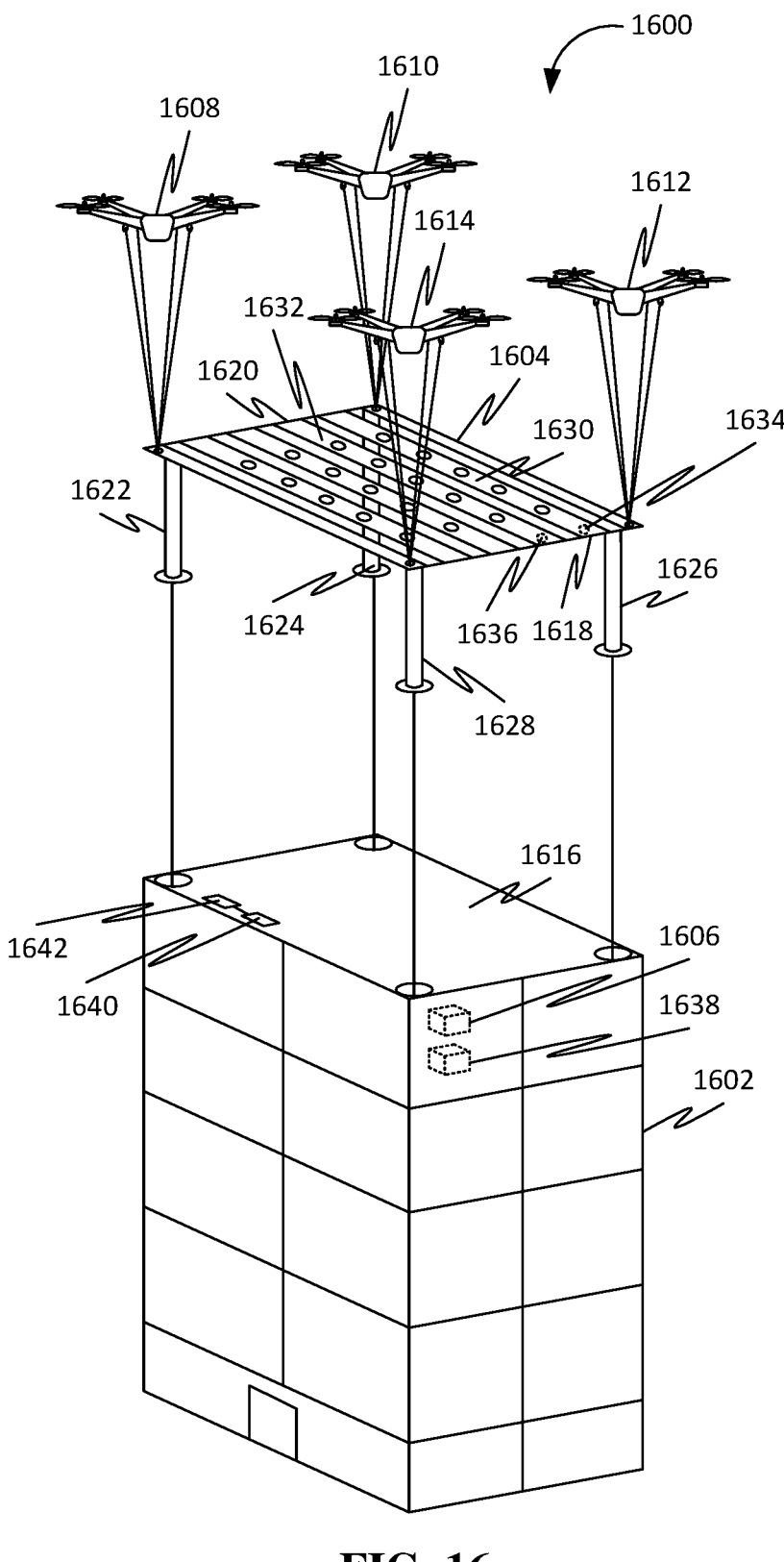
FIG. 16 is a perspective view of an apparatus 1600 for protecting a building 1602 from weather elements, in accordance with some embodiments.

FIG. 16 is a perspective view of an apparatus 1600 for protecting a building 1602 from weather elements, in accordance with some embodiments. Accordingly, the apparatus 1600 may include a structure 1604, at least one pumping assembly 1606, at least one elevating assembly 1608-1614, a communication device 1640, and a processing device 1642.

Further, the structure 1604 may be configured to be installed on a roof 1616 of the building 1602. Further, the structure 1604 may be elevatable to at least one elevated position from an unelevated position for positioning the structure 1604 in relation to the building 1602. Further, the structure 1604 may be disposed on the roof 1616 of the building 1602 in the unelevated position. Further, the structure 1604 may be raised from the roof 1616 of the building 1602 in the at least one elevated position for protecting the building 1602 from at least one weather element. Further, the structure 1604 may include at least one hydroponic cultivating unit 1618-1620 and at least one tubing unit 1622-1628 attached to the at least one hydroponic cultivating unit 1618-1620. Further, each of the at least one hydroponic cultivating unit 1618-1620 may include a growing container (1630 and 1632) comprising at least one port (1634 and 1636). Further, the at least one tubing unit 1622-1628 may be fluidly coupled with the at least one port (1634 and 1636). Further, the at least one tubing unit 1622-1628 may be configured to be coupled with at least one reservoir 1638 containing a growing solution in the unelevated position.

Further, the at least one pumping assembly 1606 may be configured to be coupled with the at least one tubing unit 1622-1628 in the unelevated position. Further, the at least one pumping assembly 1606 may be configured for transferring the growing solution to the growing container (1630 and 1632) from the at least one reservoir 1638 through the at least one tubing unit 1622-1628 based on the coupling with the at least one tubing unit 1622-1628.

Further, the at least one elevating assembly 1608-1614 may be coupled with the structure 1604. Further, the at least one elevating assembly 1608-1614 may be configured for at least one of raising and lowering the structure 1604 for moving the structure 1604 between the unelevated position and the at least one elevated position by performing at least one action on the structure 1604. Further, the at least one tubing unit 1622-1628 may be configured for allowing draining of the growing solution from the growing container (1630 and 1632) to the at least one reservoir 1638 in the unelevated position. Further, the structure 1604 may be raised after the draining of the growing solution.

Further, the communication device 1640 may be communicatively coupled with the at least one elevating assembly 1608-1614. Further, the communication device 1640 may be configured for receiving at least one input data. Further, the communication device 1640 may be configured for transmitting at least one command to the at least one elevating assembly 1608-1614. Further, at least one of the raising and the lowering of the structure 1604 may be based on the at least one command.

Further, the processing device 1642 may be communicatively coupled with the communication device 1640. Further, the processing device 1642 may be configured for analyzing the at least one input data. Further, the processing device 1642 may be configured for determining at least one value of at least one parameter associated with at least one of the raising and the lowering of the structure 1604. Further, the processing device 1642 may be configured for generating the at least one command based on the determining of the at least one value of the at least one parameter.

In further embodiments, the apparatus 1600 may include at least one tether assembly coupled with the structure 1604. Further, the at least one tether assembly may be configured for movably attaching the structure 1604 to the building 1602. Further, the at least one tether assembly holds the structure 1604 in at least one of the unelevated position and the at least one elevated position by supporting the structure 1604.

Figure 17:
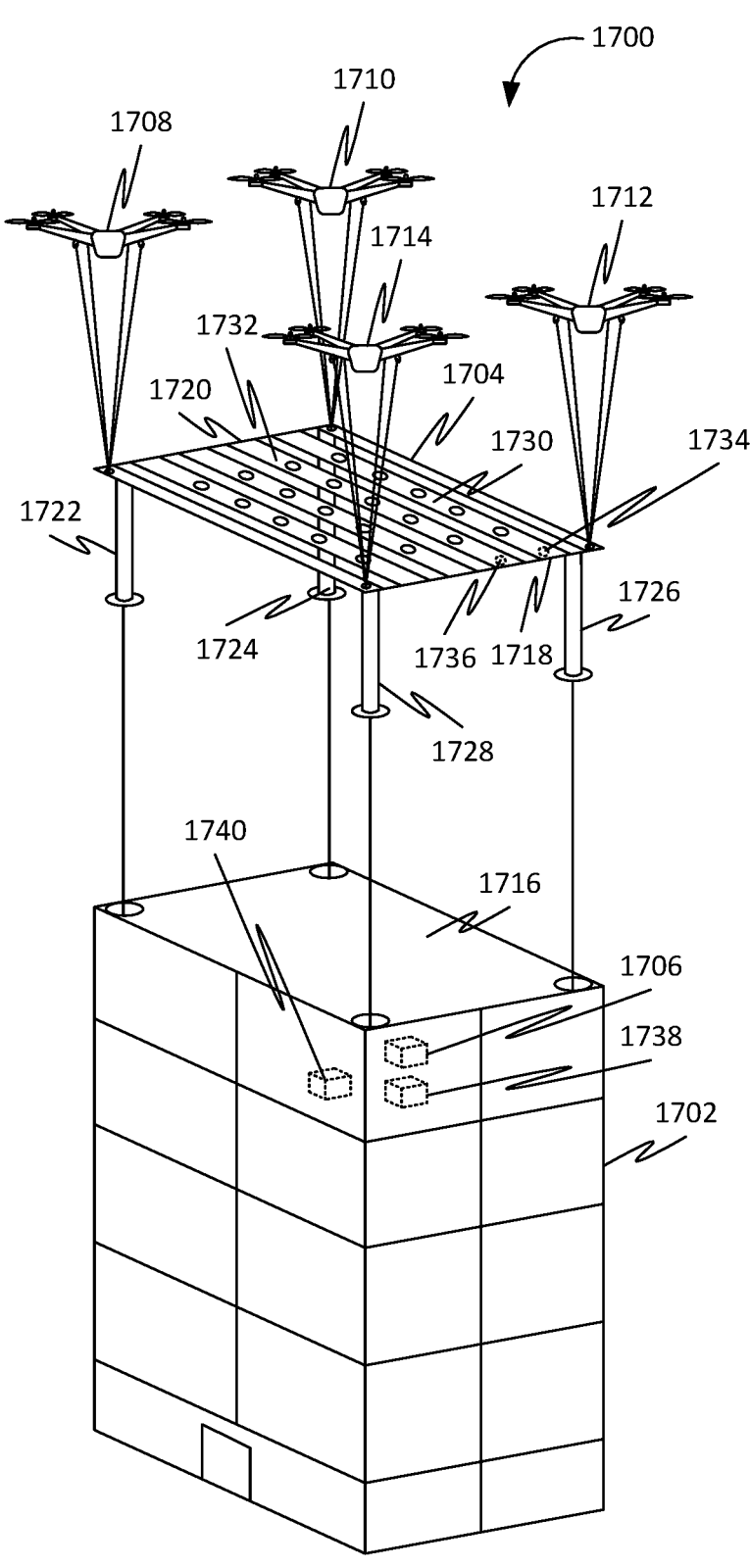
FIG. 17 is a perspective view of an apparatus 1700 for protecting a building 1702 from weather elements, in accordance with some embodiments.

FIG. 17 is a perspective view of an apparatus 1700 for protecting a building 1702 from weather elements, in accordance with some embodiments. Accordingly, the apparatus 1700 may include a structure 1704, at least one pumping assembly 1706, at least one elevating assembly 1708-1714, and at least one tether assembly 1740.

Further, the structure 1704 may be configured to be installed on a roof 1716 of the building 1702. Further, the structure 1704 may be elevatable to at least one elevated position from an unelevated position for positioning the structure 1704 in relation to the building 1702. Further, the structure 1704 may be disposed on the roof 1716 of the building 1702 in the unelevated position. Further, the structure 1704 may be raised from the roof 1716 of the building 1702 in the at least one elevated position for protecting the building 1702 from at least one weather element. Further, the structure 1704 may include at least one hydroponic cultivating unit 1718-1720 and at least one tubing unit 1722-1728 attached to the at least one hydroponic cultivating unit 1718-1720. Further, each of the at least one hydroponic cultivating unit 1718-1720 may include a growing container (1730 and 1732) comprising at least one port (1734 and 1736). Further, the at least one tubing unit 1722-1728 may be fluidly coupled with the at least one port (1734 and 1736). Further, the at least one tubing unit 1722-1728 may be configured to be coupled with at least one reservoir 1738 containing a growing solution in the unelevated position.

Further, the at least one pumping assembly 1706 may be configured to be coupled with the at least one tubing unit 1722-1728 in the unelevated position. Further, the at least one pumping assembly 1706 may be configured for transferring the growing solution to the growing container (1730 and 1732) from the at least one reservoir 1738 through the at least one tubing unit 1722-1728 based on the coupling with the at least one tubing unit 1722-1728.

Further, the at least one elevating assembly 1708-1714 may be coupled with the structure 1704. Further, the at least one elevating assembly 1708-1714 may be configured for at least one of raising and lowering the structure 1704 for moving the structure 1704 between the unelevated position and the at least one elevated position by performing at least one action on the structure 1704. Further, the at least one tubing unit 1722-1728 may be configured for allowing draining of the growing solution from the growing container (1730 and 1732) to the at least one reservoir 1738 in the unelevated position. Further, the structure 1704 may be raised after the draining of the growing solution.

Further, the at least one tether assembly 1740 may be coupled with the structure 1704. Further, the at least one tether assembly 1740 may be configured for movably attaching the structure 1704 to the building 1702. Further, the at least one tether assembly 1740 holds the structure 1704 in at least one of the unelevated position and the at least one elevated position by supporting the structure 1704. Further, the at least one tether assembly 1740 may be configured for supportably at least one of the raising and the lowering of the structure 1704.

Figure 18:
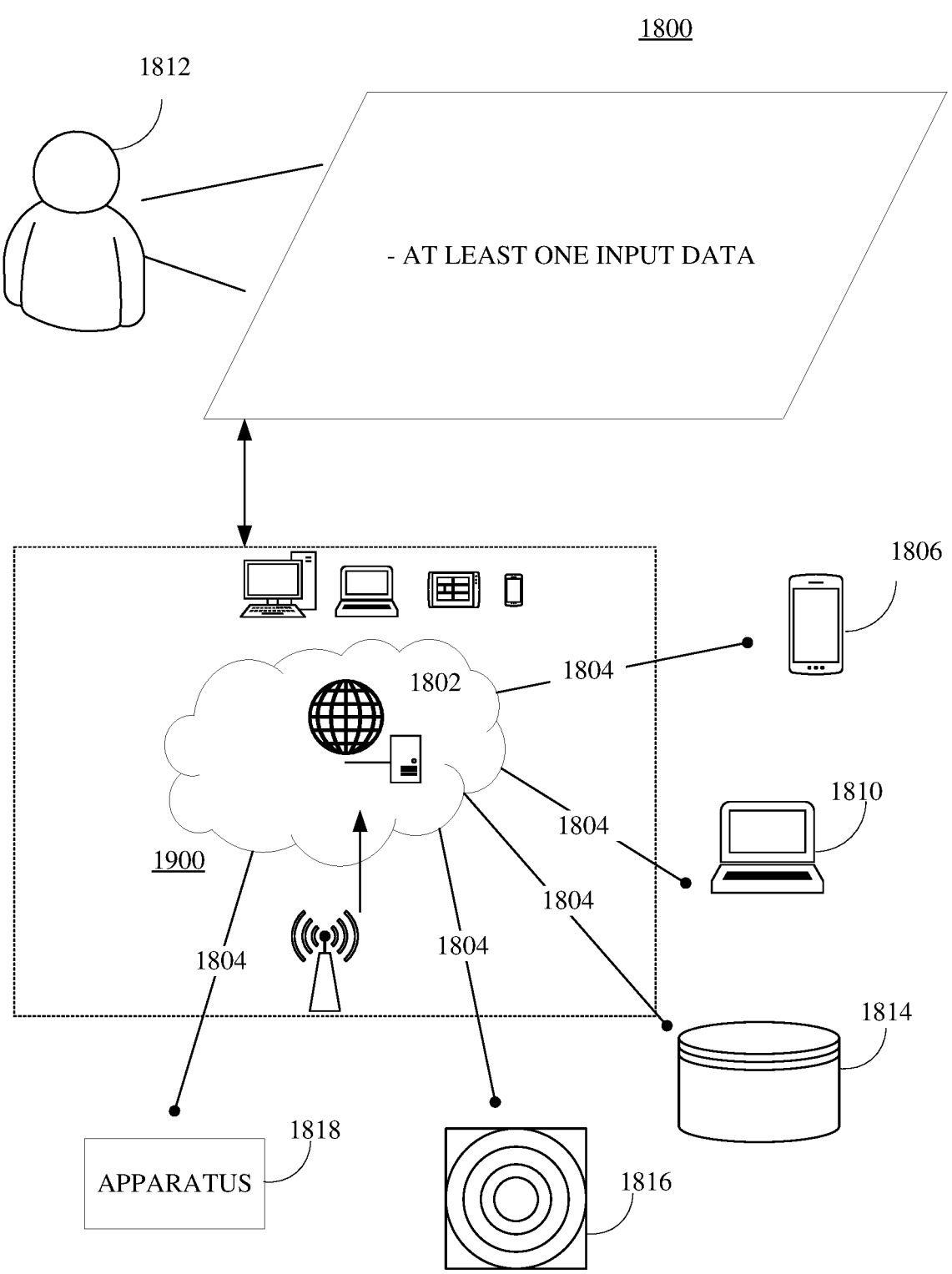
FIG. 18 is an illustration of an online platform consistent with various embodiments of the present disclosure.

FIG. 18 is an illustration of an online platform 1800 consistent with various embodiments of the present disclosure. By way of non-limiting example, the online platform 1800 to facilitate protecting a building from weather elements using an apparatus may be hosted on a centralized server 1802, such as, for example, a cloud computing service. The centralized server 1802 may communicate with other network entities, such as, for example, a mobile device 1806 (such as a smartphone, a laptop, a tablet computer, etc.), other electronic devices 1810 (such as desktop computers, server computers, etc.), databases 1814, sensors 1816, and an apparatus 1818 (such as the apparatus 100, the apparatus 1600, and the apparatus 1700) over a communication network 1804, such as, but not limited to, the Internet. Further, users of the online platform 1800 may include relevant parties such as, but not limited to, users, administrators, service providers, service consumers, and so on. Accordingly, in some instances, electronic devices operated by the one or more relevant parties may be in communication with the platform.

A user 1812, such as the one or more relevant parties, may access online platform 1800 through a web based software application or browser. The web based software application may be embodied as, for example, but not be limited to, a website, a web application, a desktop application, and a mobile application compatible with a computing device 1900.

Figure 19:
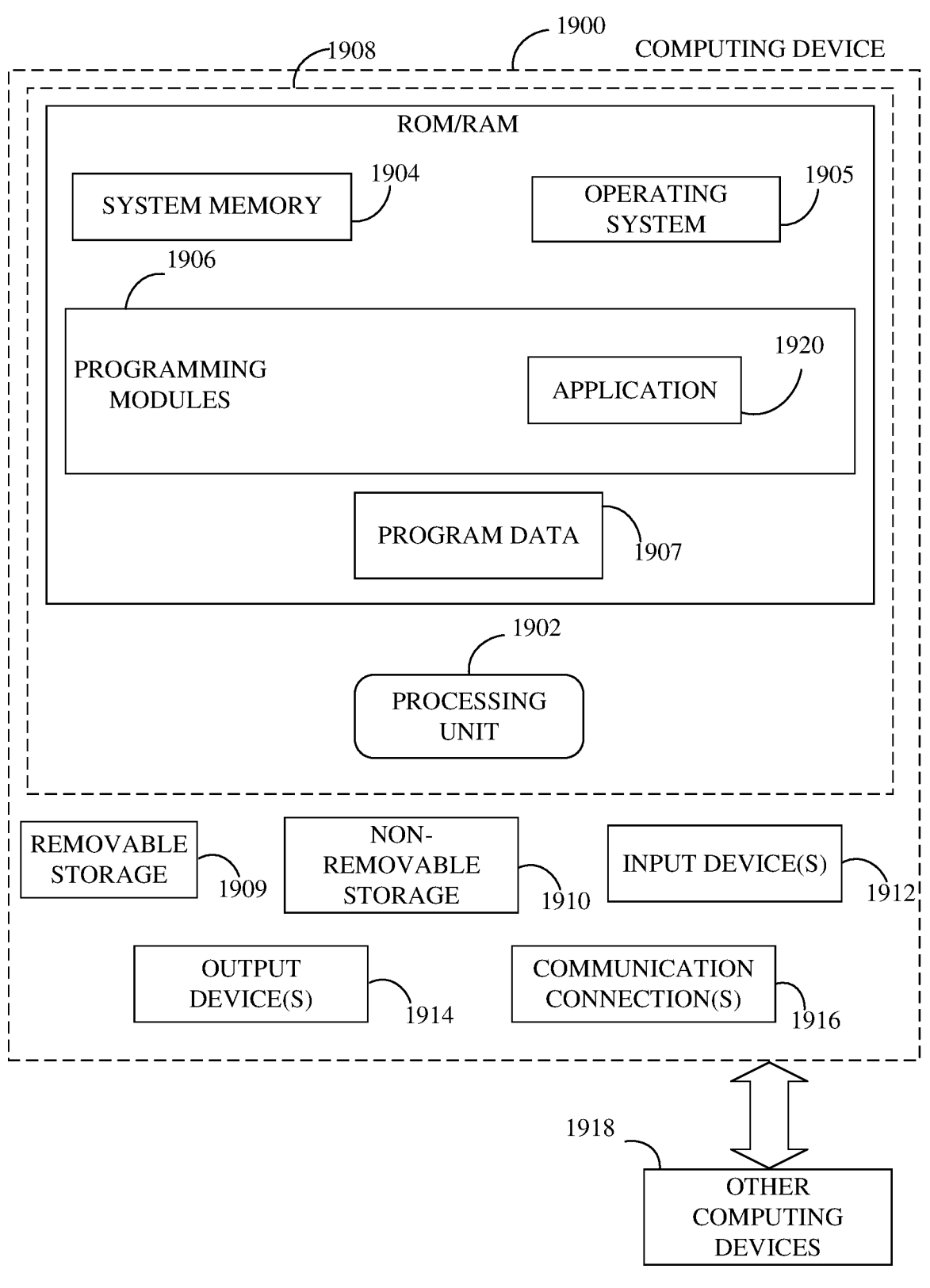
FIG. 19 is a block diagram of a computing device for implementing the methods disclosed herein, in accordance with some embodiments.

With reference to FIG. 19, a system consistent with an embodiment of the disclosure may include a computing device or cloud service, such as computing device 1900. In a basic configuration, computing device 1900 may include at least one processing unit 1902 and a system memory 1904. Depending on the configuration and type of computing device, system memory 1904 may comprise, but is not limited to, volatile (e.g. random-access memory (RAM)), non-volatile (e.g. read-only memory (ROM)), flash memory, or any combination. System memory 1904 may include operating system 1905, one or more programming modules 1906, and may include a program data 1907. Operating system 1905, for example, may be suitable for controlling computing device 1900's operation. In one embodiment, programming modules 1906 may include image-processing module, machine learning module. Furthermore, embodiments of the disclosure may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and non-volatile, removable and non-removable media implemented in any method or technology for storage of information, such as computer-readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, a location sensor, a camera, a biometric sensor, etc. Output device(s) 1914 such as a display, speakers, a printer, etc. may also be included. The aforementioned devices are examples and others may be used.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1904, including operating system 1905. While executing on processing unit 1902, programming modules 1906 may perform processes including, for example, one or more stages of methods, algorithms, systems, applications, servers, databases as described above. The aforementioned process is an example, and processing unit 1902 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for protecting a building from weather elements, the apparatus comprising:
a structure configured to be installed on a roof of the building, wherein the structure is elevatable to at least one elevated position from an unelevated position for positioning the structure in relation to the building, wherein the structure is disposed on the roof of the building in the unelevated position, wherein the structure is raised from the roof of the building in the at least one elevated position for protecting the building from at least one weather element, wherein the structure comprises at least one hydroponic cultivating unit and at least one tubing unit attached to the at least one hydroponic cultivating unit, wherein each of the at least one hydroponic cultivating unit comprises a growing container comprising at least one port, wherein the at least one tubing unit is fluidly coupled with the at least one port, wherein the at least one tubing unit is configured to be coupled with at least one reservoir containing a growing solution in the unelevated position, wherein at least a portion of the structure is coated with at least one material, wherein the at least one material is a heat reflector, wherein the protecting of the building from the at least one weather element is further based on the at least one material;
at least one pumping assembly configured to be coupled with the at least one tubing unit in the unelevated position, wherein the at least one pumping assembly is configured for transferring the growing solution to the growing container from the at least one reservoir through the at least one tubing unit based on the coupling with the at least one tubing unit; and
at least one elevating assembly coupled with the structure, wherein the at least one elevating assembly is configured for at least one of raising and lowering the structure for moving the structure between the unelevated position and the at least one elevated position by performing at least one action on the structure, wherein the at least one tubing unit is configured for allowing draining of the growing solution from the growing container to the at least one reservoir in the unelevated position, wherein the structure is raised after the draining of the growing solution.

2. The apparatus of claim 1 further comprising:
a communication device communicatively coupled with the at least one elevating assembly, wherein the communication device is configured for:
receiving at least one input data; and
transmitting at least one command to the at least one elevating assembly, wherein at least one of the raising and the lowering of the structure is based on the at least one command; and
a processing device communicatively coupled with the communication device, wherein the processing device is configured for:
analyzing the at least one input data;
determining at least one value of at least one parameter associated with at least one of the raising and the lowering of the structure; and
generating the at least one command based on the determining of the at least one value of the at least one parameter.

3. The apparatus of claim 2 further comprising at least one sensor communicatively coupled with the communication device, wherein the at least one sensor is configured for generating the at least one input data based on detecting at least one variable associated with at least one of the raising and the lowering of the structure to the at least one elevated position.

4. The apparatus of claim 2 further comprising at least one input device communicatively coupled with the communication device, wherein the at least one input device is configured for generating the at least one input data based on at least one input received by the at least one input device.

5. The apparatus of claim 2, wherein the analyzing of the at least one input data comprises analyzing the at least one input data using at least one machine learning model, wherein the at least one machine learning model is trained on a dataset associated with a plurality of conditions associated with at least one of the raising and the lowering of the structure, wherein the processing device is further configured for predicting at least one condition associated with at least one of the raising and the lowering of the structure based on the analyzing of the at least one input data using the at least one machine learning model, wherein the determining of the at least one value of the at least one parameter is further based on the predicting.

6. The apparatus of claim 2, wherein the at least one elevated position is associated with a plurality of elevated hovering positions, wherein the at least one elevating assembly is configured for transitioning the structure between the plurality of elevated hovering positions associated with the at least one elevated position based on the at least one command.

7. The apparatus of claim 1 further comprising at least one tether assembly coupled with the structure, wherein the at least one tether assembly is configured for movably attaching the structure to the building, wherein the at least one tether assembly holds the structure in at least one of the unelevated position and the at least one elevated position by supporting the structure.

8. The apparatus of claim 7, wherein the at least one tether assembly is configured for supportably at least one of raising and the lowering of the structure.

9. The apparatus of claim 8 further comprising:
a communication device communicatively coupled with the at least one tether assembly, wherein the communication device is configured for:

receiving at least one input data; and transmitting at least one command to the at least one tether assembly, wherein the supportably at least one of the raising and the lowering of the structure is based on the at least one command; and a processing device communicatively coupled with the communication device, wherein the processing device is configured for:

analyzing the at least one input data;

determining at least one value of at least one parameter associated with at least one of the raising and the lowering of the structure; and generating the at least one command based on the determining of the at least one value of the at least one parameter.

10. The apparatus of claim 9 further comprising at least one sensor communicatively coupled with the communication device, wherein the at least one sensor is configured for generating the at least one input data based on detecting at least one variable associated with at least one of the raising and the lowering of the structure.

11. The apparatus of claim 9 further comprising at least one input device communicatively coupled with the communication device, wherein the at least one input device is configured for generating the at least one input data based on at least one input received by the at least one input device.

12. The apparatus of claim 9, wherein the analyzing of the at least one input data comprises analyzing the at least one input data using at least one machine learning model, wherein the at least one machine learning model is trained on a dataset associated with a plurality of conditions associated with at least one of the raising and the lowering of the structure, wherein the processing device is further configured for predicting at least one condition associated with at least one of the raising and the lowering of the structure based on the analyzing of the at least one input data using the at least one machine learning model, wherein the determining of the at least one value of the at least one parameter is further based on the predicting.

13. The apparatus of claim 1, wherein the structure comprises at least one buoyant element comprised in the structure, wherein the at least one buoyant element facilitates the raising of the structure from the unelevated position to the at least one elevated position.

14. The apparatus of claim 1, wherein the structure comprises at least one extendable element, wherein the at least one extendable element is configured to be transitioned between a retracted position and at least one extended position, wherein the structure is associated with a level of protection for the protecting of the building in the at least one elevated position, wherein the at least one extendable element increases the level of protection of the structure by at least one amount in the at least one extended position.

15. The apparatus of claim 1, wherein the structure comprises at least one solar energy device, wherein the at least one solar energy device is attached to at least a portion of the structure, wherein the at least one solar energy device is comprised of at least one absorber material, wherein the protecting of the building from the at least one weather element is based on the at least one absorber material.

16. The apparatus of claim 1, wherein the at least one hydroponic cultivating unit is attached to at least a portion of the structure, wherein the at least one hydroponic cultivating unit comprises at least one plant grown in the at least one hydroponic cultivating unit, wherein the protecting of the building from the at least one weather element is based on the at least one plant.

17. An apparatus for protecting a building from weather elements, the apparatus comprising:

a structure configured to be installed on a roof of the building, wherein the structure is elevatable to at least one elevated position from an unelevated position for positioning the structure in relation to the building, wherein the structure is disposed on the roof of the building in the unelevated position, wherein the structure is raised from the roof of the building in the at least one elevated position for protecting the building from at least one weather element, wherein the structure comprises at least one hydroponic cultivating unit and at least one tubing unit attached to the at least one hydroponic cultivating unit, wherein each of the at least one hydroponic cultivating unit comprises a growing container comprising at least one port, wherein the at least one tubing unit is fluidly coupled with the at least one port, wherein the at least one tubing unit is configured to be coupled with at least one reservoir containing a growing solution in the unelevated position;

at least one pumping assembly configured to be coupled with the at least one tubing unit in the unelevated position, wherein the at least one pumping assembly is configured for transferring the growing solution to the growing container from the at least one reservoir through the at least one tubing unit based on the coupling with the at least one tubing unit;

at least one elevating assembly coupled with the structure, wherein the at least one elevating assembly is configured for at least one of raising and lowering the structure for moving the structure between the unelevated position and the at least one elevated position by performing at least one action on the structure, wherein the at least one tubing unit is configured for allowing draining of the growing solution from the growing container to the at least one reservoir in the unelevated position, wherein the structure is raised after the draining of the growing solution;

a communication device communicatively coupled with the at least one elevating assembly, wherein the communication device is configured for:

receiving at least one input data; and transmitting at least one command to the at least one elevating assembly, wherein at least one of the raising and the lowering of the structure is based on the at least one command; and a processing device communicatively coupled with the communication device, wherein the processing device is configured for:

analyzing the at least one input data;

determining at least one value of at least one parameter associated with at least one of the raising and the lowering of the structure; and generating the at least one command based on the determining of the at least one value of the at least one parameter.

18. The apparatus of claim 17 further comprising at least one tether assembly coupled with the structure, wherein the at least one tether assembly is configured for movably attaching the structure to the building, wherein the at least one tether assembly holds the structure in at least one of the unelevated position and the at least one elevated position by supporting the structure.

19. An apparatus for protecting a building from weather elements, the apparatus comprising:

a structure configured to be installed on a roof of the building, wherein the structure is elevatable to at least one elevated position from an unelevated position for positioning the structure in relation to the building, wherein the structure is disposed on the roof of the building in the unelevated position, wherein the structure is raised from the roof of the building in the at least one elevated position for protecting the building from at least one weather element, wherein the structure comprises at least one hydroponic cultivating unit and at least one tubing unit attached to the at least one hydroponic cultivating unit, wherein each of the at least one hydroponic cultivating unit comprises a growing container comprising at least one port, wherein the at least one tubing unit is fluidly coupled with the at least one port, wherein the at least one tubing unit is configured to be coupled with at least one reservoir containing a growing solution in the unelevated position;

at least one pumping assembly configured to be coupled with the at least one tubing unit in the unelevated position, wherein the at least one pumping assembly is configured for transferring the growing solution to the growing container from the at least one reservoir through the at least one tubing unit based on the coupling with the at least one tubing unit;

at least one elevating assembly coupled with the structure, wherein the at least one elevating assembly is configured for at least one of raising and lowering the structure for moving the structure between the unelevated position and the at least one elevated position by performing at least one action on the structure, wherein the at least one tubing unit is configured for allowing draining of the growing solution from the growing container to the at least one reservoir in the unelevated position, wherein the structure is raised after the draining of the growing solution;

at least one tether assembly coupled with the structure, wherein the at least one tether assembly is configured for movably attaching the structure to the building, wherein the at least one tether assembly holds the structure in at least one of the unelevated position and the at least one elevated position by supporting the structure, wherein the at least one tether assembly is configured for supportably at least one of the raising and the lowering of the structure;

a communication device communicatively coupled with the at least one tether assembly, wherein the communication device is configured for:

receiving at least one input data; and transmitting at least one command to the at least one tether assembly, wherein the supportably at least one of the raising and the lowering of the structure is based on the at least one command; and a processing device communicatively coupled with the communication device, wherein the processing device is configured for:

analyzing the at least one input data;

determining at least one value of at least one parameter associated with at least one of the raising and the lowering of the structure; and generating the at least one command based on the determining of the at least one value of the at least one parameter.

* * * * *